(12) United States Patent
Yamada et al.

(10) Patent No.: US 8,187,548 B2
(45) Date of Patent: May 29, 2012

(54) CATALYST-SUPPORTED PARTICULATE FILTER

(75) Inventors: Hiroshi Yamada, Hiroshima (JP); Kenji Suzuki, Higashi-Hiroshima (JP); Koichiro Harada, Higashi-Hiroshima (JP); Kenji Okamoto, Hiroshima (JP); Akihida Takami, Hiroshima (JP)

(73) Assignee: Mazda Motor Corporation (JP)

( * ) Notice: Subject to any disclaimer, the term of this patent is extended or adjusted under 35 U.S.C. 154(b) by 895 days.

(21) Appl. No.: 12/249,123

(22) Filed: Oct. 10, 2008

(65) Prior Publication Data

US 2009/0107124 A1   Apr. 30, 2009

(30) Foreign Application Priority Data

Oct. 30, 2007   (JP) ................ 2007-281855
Oct. 30, 2007   (JP) ................ 2007-281862
Oct. 30, 2007   (JP) ................ 2007-281866

(51) Int. Cl.
*B01D 53/38* (2006.01)
*B01J 23/10* (2006.01)

(52) U.S. Cl. ......... 422/177; 422/180; 502/304; 502/439

(58) Field of Classification Search ............... 422/177, 422/180; 502/304, 349, 439
See application file for complete search history.

(56) References Cited

U.S. PATENT DOCUMENTS

| | | | | |
|---|---|---|---|---|
| 6,150,288 A | * | 11/2000 | Suzuki et al. | 501/105 |
| 7,307,039 B2 | * | 12/2007 | Iwakuni et al. | 502/304 |
| 2006/0245985 A1 | | 11/2006 | Harada et al. | |
| 2007/0054800 A1 | | 3/2007 | Harada et al. | |
| 2007/0191219 A1 | | 8/2007 | Fujita et al. | |
| 2007/0196245 A1 | | 8/2007 | Fujita et al. | |
| 2008/0254973 A1 | | 10/2008 | Okamoto et al. | |

FOREIGN PATENT DOCUMENTS

| | | |
|---|---|---|
| EP | 0856350 A1 | 8/1998 |
| EP | 1920835 A2 | 5/2008 |
| JP | 2007-054713 | 3/2007 |
| JP | 2007-083224 | 4/2007 |
| JP | 2007-098200 | 4/2007 |
| JP | 2008-221204 A | 9/2008 |
| WO | 2005-102933 A2 | 11/2005 |
| WO | 2005102933 A2 | 11/2005 |

OTHER PUBLICATIONS

Machine translation of JP 2007-083224, 21 pages.*
Herbert Luethe, European Search Report, EP08166523, Dec. 19, 2008.

* cited by examiner

*Primary Examiner* — Jill Warden
*Assistant Examiner* — Joye L Woodard
(74) *Attorney, Agent, or Firm* — Studebaker & Brackett PC; Donald R. Studebaker

(57) ABSTRACT

A catalyst layer formed on the walls of exhaust gas channels in a particulate filter contains a catalyst material containing at least two kinds of primary particles selected from the group consisting of primary particles of activated alumina, primary particles of a ZrNd-based mixed oxide and primary particles of a CeZr-based mixed oxide. The catalyst material is formed so that primary particles of one of the ZrNd-based mixed oxide and the CeZr-based mixed oxide are dispersedly carried on the surface of each of secondary particles. Each secondary particle is formed by cohesion of at least one kind of primary particles selected from the group consisting of primary particles of activated alumina and primary particles of the other of the ZrNd-based mixed oxide and the CeZr-based mixed oxide.

3 Claims, 14 Drawing Sheets

CATALYST-SUPPORTED PARTICULATE FILTER

CROSS-REFERENCES TO RELATED APPLICATIONS

This application claims priority under 35 USC 119 to Japanese Patent Application Nos. 2007-281855, 2007-281862 and 2007-281866 all filed on Oct. 30, 2007, the entire contents of all of which are incorporated herein by reference.

BACKGROUND OF THE INVENTION (a) Field of the Invention

This invention relates to catalyst-supported particulate filters.

(b) Description of Related Art

Exhaust gases from diesel engines using fuels containing diesel oil as a main component and exhaust gases from gasoline engines using fuels containing gasoline as a main component to burn them under fuel-lean conditions are known to contain not only hydrocarbons (HC), carbon monoxide (CO) and nitrogen oxides (NOx), but also particulates (suspended particulate matters containing carbon particles). To restrain particulates in exhaust gas from being exhausted to the atmosphere, a filter for trapping the particulates is disposed in an exhaust gas passage of such an engine. However, when the amount of particulates deposited on the filter becomes large, this causes deterioration of engine power and fuel efficiency. Therefore, in this case, it is necessary to burn the deposited particulates as appropriate to remove them from the filter.

To effectively burn such deposited particulates (ignite the particulates at relatively low temperature and burn them out in a short period of time), a catalyst layer containing alumina carrying platinum (Pt) as a catalytic metal is formed on the walls of exhaust gas channels in the body of such a filter. Such Pt-carried alumina is effective in burning particulates as well as converting HC and CO, but there have been recently developed catalyst materials for filters capable of more efficiently burning particulates.

Published Japanese Patent Application No. 2006-326573 describes the use of such a catalyst material in a filter. The catalyst material is a material in which a catalytic metal, such as Pt, is carried on a mixed oxide (composite oxide) containing cerium (Ce), zirconium (Zr) and a rare earth metal R selected from among praseodymium (Pr), neodymium (Nd) and lanthanum (La). The published document also describes that the content of R in the mixed oxide is preferably 2% to 11% by mole, both inclusive. Since such a mixed oxide contains Ce, it has oxygen storage/release capacity so that oxygen released from the mixed oxide promotes ignition and burning of particulates.

Published Japanese Patent Application No. 2007-54713 describes the use of another catalyst material in a filter. The catalyst material is a material in which a catalytic metal is carried on mixed oxide ZrRO particles containing Zr and a rare earth metal R selected from among ytterbium (Yb), Nd and scandium (Sc) and having an R content of up to 18% by mole and mixed oxide CeMO particles containing Ce and a rare earth metal M selected from among samarium (Sm) and gadolinium (Gd). The ZrRO particles have oxygen ion conductivity to thereby release active oxygen but their oxygen release mechanism is different from that of CeZr-based mixed oxides as disclosed in Published Japanese Patent Application No. 2006-326573.

Specifically, CeZr-based mixed oxides have high oxygen storage capacity and release active oxygen by the valence change of Ce ions. On the other hand, the ZrRO particles have oxygen ion conductivity, i.e., so-called oxygen pumping function, and, when having both of high-oxygen concentration sites and low-oxygen concentration sites on the particle surfaces, transport oxygen ions from high-oxygen concentration sites to low-oxygen concentration sites and then release them as active oxygen.

Therefore, for the ZrRO particles, when a small ignition site causing particulates to burn is formed on their surface and then falls into lack of oxygen, oxygen is transported from other high-oxygen concentration sites. Thus, the burning is continued and the burning region on each particle can be easily extended from the ignition site to the surrounding sites.

Published Japanese Patent Application No. 2007-83224 describes the use of still another catalyst material in a filter. The catalyst material is a material in which a catalytic precious metal is carried on ZrRO having oxygen ion conductivity as stated above and alumina.

Published Japanese Patent Application No. 2007-98200 describes a method for manufacturing a catalyst material for converting exhaust gas components. In this method, an excessive amount of aqueous ammonia is first added to a mixture of an aqueous solution of aluminium nitrate and an aqueous solution of lanthanum nitrate to precipitate a first hydroxide containing Al and La. Next, a mixture of an aqueous solution of cerium nitrate and an aqueous solution of zirconium nitrate is further added to the above mixture to precipitate a second hydroxide containing Ce and Zr over the precipitate of the first hydroxide. Then, the obtained precipitate of the first and second hydroxides is filtrated, dried and calcined. According to this method, a catalyst material is obtained in which each of activated alumina particles containing La forms a core and the whole surface of the core is covered with a Ce—Zr mixed oxide serving as a shell.

Published Japanese Patent Application No. 2005-313029 discloses that metal oxide particles each including a core containing a large proportion of zirconia and a shell containing a large proportion of ceria are used for an exhaust gas purification catalyst, wherein the core and shell are each composed of a plurality of primary particles, the diameter of the primary particles of the shell is smaller than that of the primary particles of the core and each of the primary particles of the core or the shell is made of a ceria-zirconia solid solution or contains yttrium (Y).

SUMMARY OF THE INVENTION

The above CeZr-based mixed oxide particles having oxygen storage capacity and the above Zr-based mixed oxide particles having oxygen ion conductivity promote the conversion of HC and CO by oxidation and also promote the ignition and burning of particulates deposited on the filter. These mixed oxide particles, however, have the following problems.

These mixed oxide particles can be obtained by a coprecipitation method in which a basic solution is added to and mixed with an acid solution containing metal ions, such as Ce or Zr, to obtain a precipitate and the precipitate is dried and calcined. In this case, primary particles of a mixed oxide are formed by calcining the precipitate and secondary particles are formed by cohesion and growth of the primary particles. If such mixed oxide secondary particles are exposed to high-temperature exhaust gas, they further cohere and grow to reduce their specific surface areas. Thus, exhaust gas is prevented from smoothly diffusing into the insides of the particles and in turn catalytic metal particles are buried in the particles or cohere, which deteriorates the HC and CO conversion performance and the particulate burning property.

Furthermore, for CeZr-based mixed oxide particles having oxygen storage capacity, oxygen storage and release occur mainly at their surfaces and their insides are hardly involved in oxygen storage and release. Therefore, if the particle size increases, each particle increases the internal volume not used for oxygen storage and release and accordingly deteriorates the oxygen storage/release efficiency.

For Zr-based mixed oxide particles having oxygen ion conductivity, if the particle size increases, each particle increases the distance for which an oxygen ion is conducted from a high-oxygen concentration site on the surface through the inside to a low-oxygen concentration site on the surface and the oxygen concentration gradient in the inside of the particle decreases. As a result, the oxygen ion conductivity of the particle deteriorates and the amount of oxygen supplied from the inside of the particle is reduced.

For the catalyst material disclosed in Published Japanese Patent Application No. 2007-98200, the Ce—Zr mixed oxide particles serving as a shell have relatively small particle size and the activated alumina particle serving as a core also has a small particle size (approximately 0.05 µm at maximum). The reason for this is as follows. The precursor of the activated alumina primary particle is a precipitated particle of a hydroxide containing Al and La. A hydroxide containing Ce and Zr (a Ce—Zr mixed oxide precursor) precipitates over the precipitated particle serving as the precursor of the primary particle to cover the precipitated particle. As a result, the Ce—Zr mixed oxide prevents cohesion of activated alumina particles, whereby the activated alumina particles have small particle size.

Thus, the whole surface of each activated alumina particle is covered with Ce—Zr mixed oxide particles. Therefore, the catalytic metal is carried on the Ce—Zr mixed oxide particles but hardly carried on the activated alumina particles serving as cores. As a result, the activated alumina particles are not effectively used as a support material allowing the catalytic metal to be carried on the catalyst with high dispersivity, whereby the catalyst cannot be expected to provide a high catalytic activity.

On the other hand, oxides disclosed in Published Japanese Patent Application No. 2005-313029, such as zirconia, a ceria-zirconia solid solution or an oxide containing Y in addition to zirconia or the ceria-zirconia solid solution, cannot be expected to exhibit high oxygen ion conductivity and in turn high particulate burning property or high catalytic activity.

With the foregoing in mind, an object of the invention is to provide a catalyst-supported particulate filter enhancing the conversion performance for exhaust gas components (including HC, CO and particulates) and enhancing the heat resistance of the catalyst material.

Specifically, an aspect of the present invention is a catalyst-supported particulate filter in which a catalyst layer is formed on the walls of exhaust gas channels in a filter body for trapping particulates exhausted from an engine, wherein the catalyst layer contains a catalyst material containing at least two kinds of primary particles selected from the group consisting of: primary particles of activated alumina; primary particles of a ZrNd-based mixed oxide containing Zr, Nd and a rare earth metal M other than Ce and Nd; and primary particles of a CeZr-based mixed oxide containing Ce, Zr and a rare earth metal R other than Ce, and the catalyst material is formed so that primary particles of one of the ZrNd-based mixed oxide and the CeZr-based mixed oxide are dispersedly carried on the surface of each of secondary particles, each said secondary particle being formed by cohesion of at least one kind of primary particles selected from the group consisting of primary particles of activated alumina and primary particles of the other of the ZrNd-based mixed oxide and the CeZr-based mixed oxide.

In a preferred embodiment of the present invention, each of the secondary particles is formed by cohesion of primary particles of activated alumina, primary particles of the ZrNd-based mixed oxide are dispersedly carried on the surface of each of the secondary particles, and each of the primary particles of the ZrNd-based mixed oxide contains $ZrO_2$ at a proportion of 55% by mole inclusive to 90% by mole exclusive.

Primary particles of the ZrNd-based mixed oxide have oxygen ion conductivity and are dispersedly carried on the surface of each secondary particle containing activated alumina particles. Therefore, even if exposed to high-temperature exhaust gas, the primary particles of the ZrNd-based mixed oxide are less likely to cohere and grow, unlike the case where the ZrNd-based mixed oxide is formed into secondary particles, and are thereby prevented from significantly deteriorating the oxygen ion conductivity.

Furthermore, since the ZrNd-based mixed oxide particles are carried in the form of small primary particles on each secondary particle, they have a larger specific surface area than when they are formed into large secondary particles. Thus, the amount of oxygen ions supplied from high-oxygen concentration sites on the particle surface to low-oxygen concentration sites thereon increases, which is advantageous in promoting the oxidation of HC and CO and the burning of particulates.

In addition, when a catalytic metal is carried on the catalyst material of this embodiment, the catalytic metal is carried not only on the ZrNd-based mixed oxide particles but also on activated alumina particles exposed through spaces between adjacent ZrNd-based mixed oxide particles. Therefore, the activated alumina particles having large specific surface area effectively act as a support material for carrying the catalytic metal with high dispersivity, whereby oxidation of HC and CO in exhaust gas and oxidation of NO in exhaust gas into $NO_2$ can be accomplished using the catalytic metal carried on the activated alumina particles. Furthermore, heat produced by oxidation reaction of these exhaust gas components promotes the burning of the particulates and produced $NO_2$ serves as an oxidizing agent for efficiently burning the particulates. Furthermore, the catalytic metal effectively acts to promote the conduction of oxygen ions in the ZrNd-based mixed oxide particles, and active oxygen released from the ZrNd-based mixed oxide particles is efficiently used when the catalytic metal promotes the oxidation of HC and CO and the burning of particulates.

Each of the primary particles of the ZrNd-based mixed oxide preferably contains $ZrO_2$ at a proportion of 55% by mole inclusive to 90% by mole exclusive. This provides high particulate burning property while enhancing HC and CO conversion performance at low temperatures and prevents a large amount of CO from being produced during burning of particulates.

The proportion of the primary particles of the ZrNd-based mixed oxide in the total amount of the primary particles of activated alumina and the primary particles of the ZrNd-based mixed oxide is preferably 20% to 90% by mass, both inclusive. This provides high particulate burning property while enhancing HC and CO conversion performance at low temperatures. More preferably, the proportion of the ZrNd-based mixed oxide primary particles is 25% to 50% by mass, both inclusive.

Examples of the rare earth metal M contained in the ZrNd-based mixed oxide particle include La, Pr, Sm, Gd and Y.

What is preferable in enhancing the exhaust gas conversion performance and the particulate burning property is the use of at least one selected from the group consisting of La and Pr. In this case, the content of $M_2O_3$ (the oxide of the rare earth metal M) in each ZrNd-based mixed oxide particle is preferably 20% by mole or less in order to reduce the amount of CO produced during burning of particulates.

Each of the secondary particles may be formed by cohesion of only primary particles of activated alumina or may be formed by cohesion of a mixture of primary particles of the CeZr-based mixed oxide and primary particles of activated alumina. In the latter case, each of the primary particles of the CeZr-based mixed oxide preferably contains $CeO_2$ at a proportion of 20% to 45% by mole, both inclusive, and each of the primary particles of the ZrNd-based mixed oxide preferably contains $ZrO_2$ at a proportion of 55% to 75% by mole, both inclusive. The activated alumina may contain about 3% to 6% by mass of $La_2O_3$ in order to enhance its heat resistance.

It is believed that when CeZr-based mixed oxide particles are used in a three-way catalyst repeating oxygen-rich conditions (fuel-lean conditions) and oxygen-lean conditions (fuel-rich conditions), they store oxygen under fuel-lean conditions and release oxygen under fuel-rich conditions. However, CeZr-based mixed oxide particles perform "oxygen exchange reactions" in which even under fuel-lean conditions they release active oxygen from inside the particle while taking oxygen into inside the particle (see Published Japanese Patent Application No. 2007-190460 filed in Japan by the Assignee). Therefore, the CeZr-based mixed oxide particles release active oxygen by the valence change of Ce ions even in an oxygen-rich gas atmosphere. This is advantageous in promoting the oxidation of HC and CO and the burning of particulates.

Pt is preferably carried as a catalytic metal on the secondary particles (the secondary particles of activated alumina or the secondary particles each formed by cohesion of a mixture of primary particles of the CeZr-based mixed oxide and primary particles of activated alumina). When Pt is carried on the activated alumina particles, this is advantageous in oxidation of NO in exhaust gas into $NO_2$. Thus, particulates can be efficiently burned using $NO_2$ as an oxidizing agent.

In another preferred embodiment of the present invention, each of the secondary particles is formed by cohesion of primary particles of activated alumina, primary particles of the CeZr-based mixed oxide are dispersedly carried on the surface of each of the secondary particles, and each of the primary particles of the CeZr-based mixed oxide contains $CeO_2$ at a proportion of 15% to 60% by mole, both inclusive.

Primary particles of the CeZr-based mixed oxide have oxygen storage capacity and are dispersedly carried on the surface of each secondary particle containing activated alumina particles. Therefore, even if exposed to high-temperature exhaust gas, the primary particles of the CeZr-based mixed oxide are less likely to cohere and grow, unlike the case where the CeZr-based mixed oxide is formed into secondary particles, and are thereby prevented from significantly deteriorating the oxygen storage capacity.

Furthermore, since the CeZr-based mixed oxide particles are carried in the form of small primary particles on each secondary particle, they have a larger specific surface area than when they are formed into large secondary particles. Therefore, the CeZr-based mixed oxide particles have high oxygen storage/release efficiency. Furthermore, the CeZr-based mixed oxide particles release active oxygen by the above-stated "oxygen exchange reaction" even in an oxygen-rich gas atmosphere. This is advantageous in promoting the oxidation of HC and CO and the burning of particulates.

In addition, when a catalytic metal is carried on the catalyst material of this embodiment, the catalytic metal is carried not only on the CeZr-based mixed oxide particles but also on activated alumina particles exposed through spaces between adjacent CeZr-based mixed oxide particles. Therefore, as in the case where primary particles of the ZrNd-based mixed oxide are dispersedly carried on each of secondary particles of activated alumina, oxidation of HC and CO in exhaust gas and oxidation of NO in exhaust gas into $NO_2$ can be accomplished using the catalytic metal carried on the activated alumina particles. Furthermore, heat produced by oxidation reaction of these exhaust gas components promotes the burning of the particulates and produced $NO_2$ serves as an oxidizing agent for efficiently burning the particulates. Furthermore, the catalytic metal effectively acts to promote the storage and release of oxygen in the CeZr-based mixed oxide particles, and active oxygen released from the CeZr-based mixed oxide particles is efficiently used when the catalytic metal promotes the oxidation of HC and CO and the burning of particulates.

Each of the primary particles of the CeZr-based mixed oxide preferably contains $CeO_2$ at a proportion of 15% to 60% by mole, both inclusive. This provides high particulate burning property while enhancing HC and CO conversion performance at low temperatures. The proportion of $CeO_2$ is more preferably 20% to 55% by mole, both inclusive, and still more preferably 20% to 45% by mole, both inclusive.

The proportion of the primary particles of the CeZr-based mixed oxide in the total amount of the primary particles of activated alumina and the primary particles of the CeZr-based mixed oxide is preferably 30% to 90% by mass, both inclusive. This provides high particulate burning property while enhancing HC and CO conversion performance at low temperatures. The proportion of the primary particles of the CeZr-based mixed oxide is more preferably 35% to 75% by mass, both inclusive, and still more preferably 35% to 50% by mass, both inclusive.

Each of the secondary particles may be formed by cohesion of only primary particles of activated alumina or may be formed by cohesion of a mixture of primary particles of the ZrNd-based mixed oxide and primary particles of activated alumina. In the latter case, each of the primary particles of the ZrNd-based mixed oxide preferably contains $ZrO_2$ at a proportion of 55% to 75% by mole, both inclusive, and each of the primary particles of the CeZr-based mixed oxide preferably contains $CeO_2$ at a proportion of 20% to 45% by mole, both inclusive. The activated alumina may contain about 3% to 6% by mass of $La_2O_3$ in order to enhance its heat resistance.

Pt is preferably carried as a catalytic metal on the secondary particles (the secondary particles of activated alumina or the secondary particles each formed by cohesion of a mixture of primary particles of the ZrNd-based mixed oxide and primary particles of activated alumina). When Pt is carried on the activated alumina particles, this is advantageous in oxidation of NO in exhaust gas into $NO_2$. Thus, particulates can be efficiently burned using $NO_2$ as an oxidizing agent.

Examples of the rare earth metal R contained in the CeZr-based mixed oxide particle include La, Nd, Pr, Sm, Gd and Y What is preferable in enhancing the particulate burning property is the use of at least one selected from the group consisting of Nd, La, Pr and Y.

In still another preferred embodiment of the present invention, each of the secondary particles is formed by cohesion of primary particles of the ZrNd-based mixed oxide, primary particles of the CeZr-based mixed oxide are dispersedly carried on the surface of each of the secondary particles, and the proportion of the ZrNd-based mixed oxide in the total amount of the ZrNd-based mixed oxide and the CeZr-based mixed oxide is 20% to 75% by mass, both inclusive.

Since secondary particles of the ZrNd-based mixed oxide contain Nd and another rare earth metal M, they have high oxygen ion conductivity. Therefore, oxygen ions are efficiently supplied from high-oxygen concentration sites on the particle surface to low-oxygen concentration sites thereon, which is advantageous in promoting the oxidation of HC and CO and the burning of particulates.

On the other hand, primary particles of the CeZr-based mixed oxide have oxygen storage capacity and are dispersedly carried on the surface of each secondary particle of the ZrNd-based mixed oxide. Therefore, even if exposed to high-temperature exhaust gas, the primary particles of the CeZr-based mixed oxide are less likely to cohere and grow, unlike the case where the CeZr-based mixed oxide is formed into secondary particles, and are thereby prevented from significantly deteriorating the oxygen storage capacity.

In addition, since the CeZr-based mixed oxide particles are carried in the form of small primary particles on each secondary particle, they have high oxygen storage/release efficiency as described previously. Furthermore, the CeZr-based mixed oxide particles release active oxygen by the above-stated "oxygen exchange reaction" even in an oxygen-rich gas atmosphere. This is advantageous in promoting the oxidation of HC and CO and the burning of particulates.

Contrary to this embodiment, it is conceivable that primary particles of the ZrNd-based mixed oxide are dispersedly carried on the surface of each secondary particle of the CeZr-based mixed oxide. For CeZr-based mixed oxide particles, however, oxygen storage and release occur mainly at their surfaces and their insides are hardly involved in oxygen storage and release. Therefore, if the particles grow to secondary particles to increase the particle size, each particle increases the internal volume not used for oxygen storage and release and accordingly deteriorates the oxygen storage/release efficiency, which does not provide desired performance.

In addition, when a catalytic metal is carried on the catalyst material of this embodiment, the catalytic metal is carried not only on the CeZr-based mixed oxide particles but also on ZrNd-based mixed oxide secondary particles exposed through spaces between adjacent CeZr-based mixed oxide particles. Therefore, the catalytic metal effectively acts to promote the oxygen storage and release in the CeZr-based mixed oxide particles and the conduction of oxygen ions in the ZrNd-based mixed oxide particles, and active oxygen released from the particles of both the mixed oxides is efficiently used when the catalytic metal promotes the oxidation of HC and CO and the burning of particulates.

The proportion of the ZrNd-based mixed oxide in the total amount of the ZrNd-based mixed oxide and the CeZr-based mixed oxide is preferably 20% to 75% by mass, both inclusive. This provides high particulate burning property while enhancing HC and CO conversion performance at low temperatures. More preferably, the proportion of the ZrNd-based mixed oxide is 25% to 67% by mass, both inclusive. The ZrNd-based mixed oxide preferably contains $ZrO_2$ at a proportion of 55% to 75% by mole, both inclusive, and the CeZr-based mixed oxide preferably contains $CeO_2$ at a proportion of 20% to 45% by mole, both inclusive.

Pt is preferably used as a catalytic metal that is to be carried on each secondary particle of the ZrNd-based mixed oxide.

Furthermore, the catalyst layer preferably contains, in addition to the catalyst material in which primary particles of the CeZr-based mixed oxide are dispersedly carried on the surface of each secondary particle of the ZrNd-based mixed oxide, a catalyst component in which Pt is carried on activated alumina particles. The catalyst component promotes the oxidation of NO in exhaust gas into $NO_2$. Thus, particulates can be efficiently burned using $NO_2$ as an oxidizing agent.

Also in this embodiment, each of the primary particles of the ZrNd-based mixed oxide preferably contains $ZrO_2$ at a proportion of 55% to 75% by mole, both inclusive, and each of the primary particles of the CeZr-based mixed oxide preferably contains $CeO_2$ at a proportion of 20% to 45% by mole, both inclusive.

DETAILED DESCRIPTION OF THE INVENTION

Hereinafter, embodiments of the present invention will be described with reference to the drawings. Note that the following description of the preferred embodiments is merely illustrative in nature and is not intended to limit the scope, applications and use of the invention.

Figure 1:
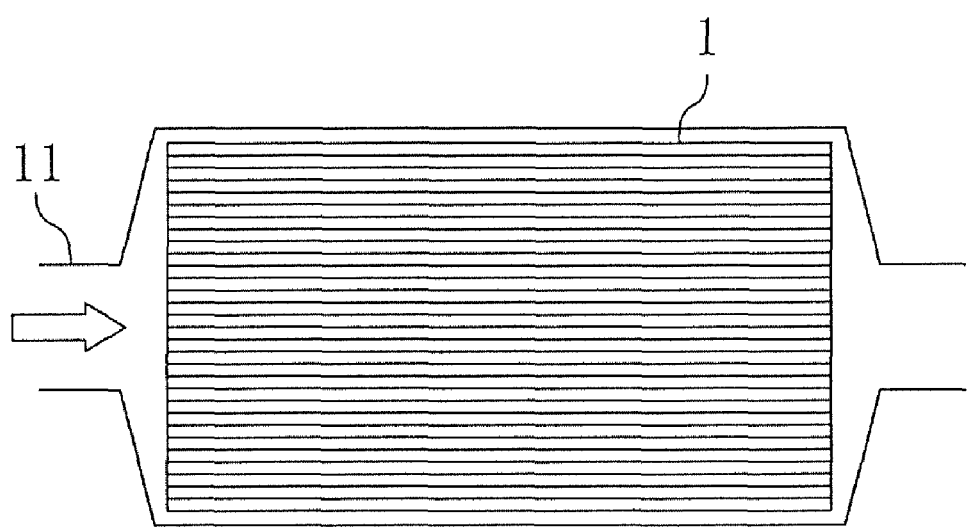
FIG. 1 is a schematic view showing the state that a particulate filter is disposed in an exhaust gas passage of an engine.

In FIG. 1, reference numeral 1 denotes a particulate filter (hereinafter, referred to simply as a "filter") disposed in an exhaust gas passage 11 of an engine.

An oxidation catalyst (not shown) can be disposed in the exhaust gas passage 11 upstream of the filter 1 in the flow direction of exhaust gas. Such an oxidation catalyst is obtained by carrying a catalytic metal, such as platinum (Pt) or palladium (Pd), on a support material such as activated alumina. When such an oxidation catalyst is disposed upstream of the filter 1, HC and CO in the exhaust gas are oxidized by the oxidation catalyst and heat of the oxidation combustion increases the temperature of exhaust gas flowing into the filter 1. Furthermore, NO in the exhaust gas is oxidized into $NO_2$ by the oxidation catalyst and produced $NO_2$ is then supplied as an oxidizing agent for burning particulates to the filter 1.

Figure 2:
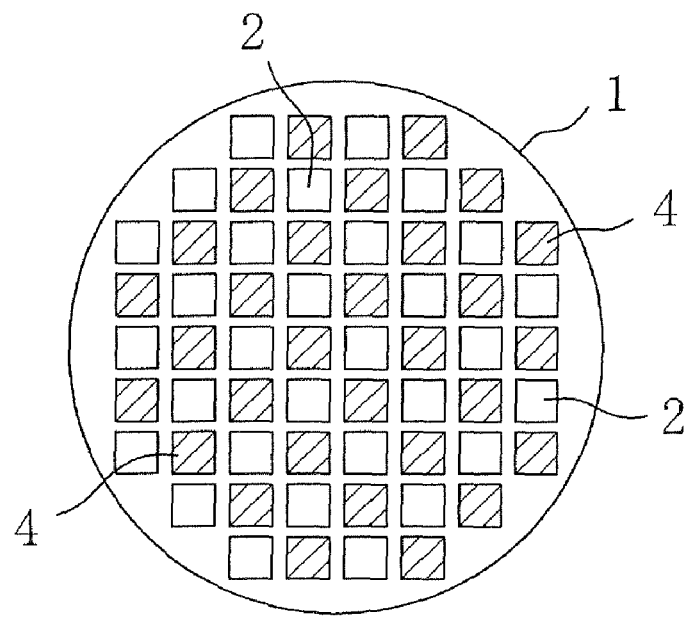
FIG. 2 is a front view schematically showing the particulate filter.
Figure 3:
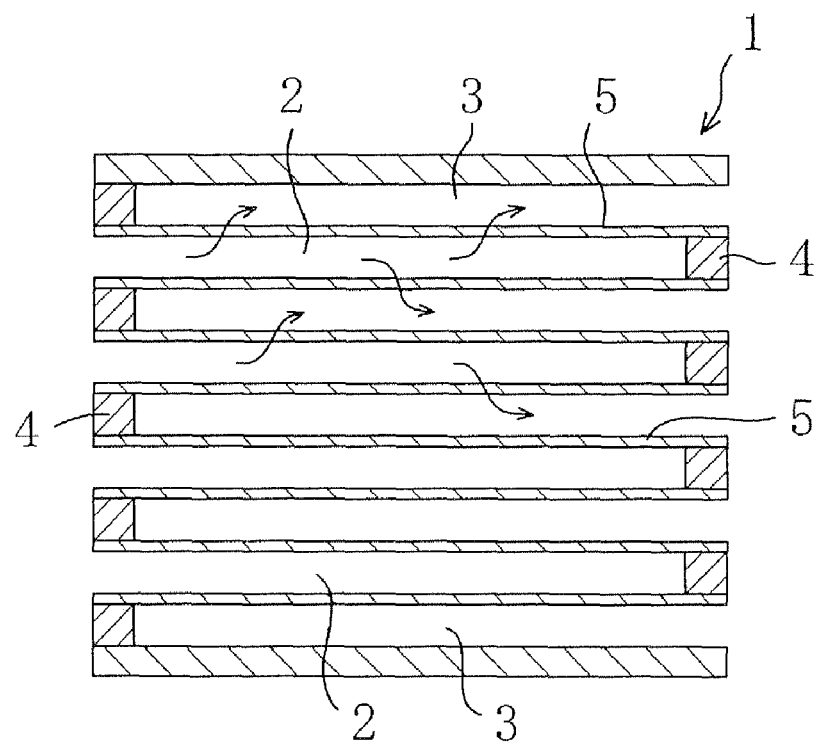
FIG. 3 is a longitudinal cross-sectional view schematically showing the particulate filter.

As schematically shown in FIGS. 2 and 3, the filter 1 has a honeycomb structure in which a large number of exhaust gas channels 2 and 3 run in parallel with each other. Specifically, the filter 1 has a structure in which a plurality of exhaust gas inflow channels 2 and a plurality of exhaust gas outflow channels 3 are alternately arranged vertically and horizontally. Each exhaust gas inflow channel 2 is closed at the downstream end by a plug 4, while each exhaust gas outflow channel 3 is closed at the upstream end by a plug 4. The adjacent exhaust gas inflow and outflow channels 2 and 3 are separated from each other by a thin partition wall 5. In FIG. 2, the hatched parts denote the plugs 4 at the upstream ends of the exhaust gas outflow channels 3.

Figure 4:
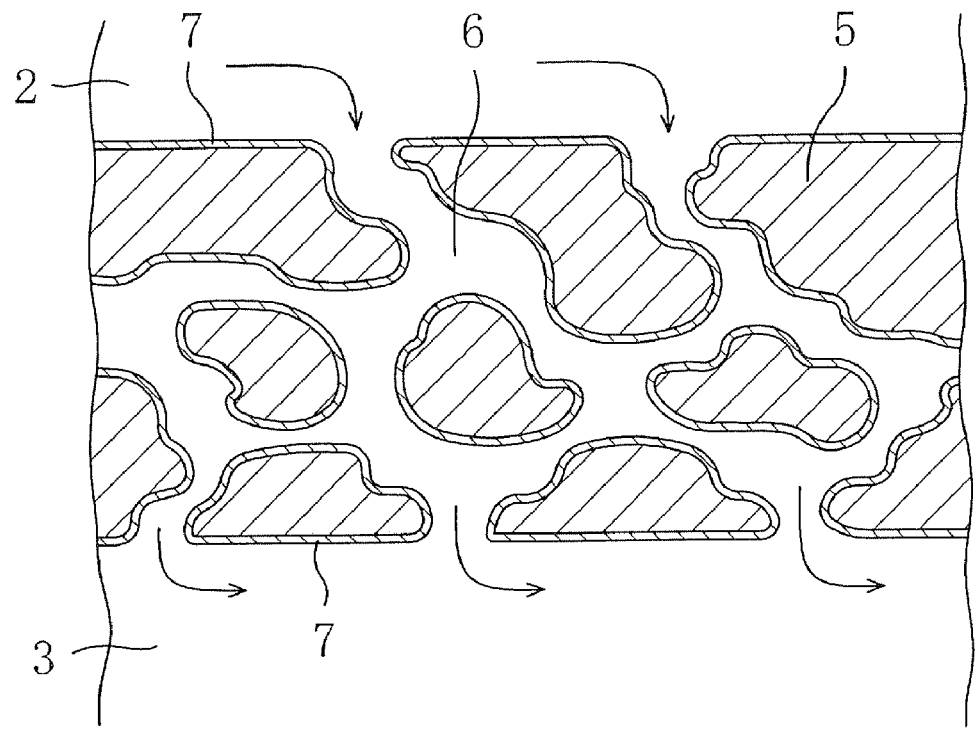
FIG. 4 is an enlarged cross-sectional view schematically showing a wall that separates an exhaust gas inflow channel from an exhaust gas outflow channel in the particulate filter.

The body of the filter 1, inclusive of the partition walls 5, is formed of cordierite or an inorganic porous material, such as SiC, $Si_3N_4$ or sialon. The exhaust gas flowing into each exhaust gas inflow channel 2 flows out through the surrounding partition walls 5 into the adjacent exhaust gas outflow channels 3, as shown in the arrows in FIG. 3. More specifically, as shown in FIG. 4, each partition wall 5 has micro pores (exhaust gas channels) 6 communicating the exhaust gas inflow channel 2 with the adjacent exhaust gas outflow channel 3 so that the exhaust gas flows through the micro pores 6. Particulates are trapped and deposited mainly on the wall surfaces of the exhaust gas inflow channels 2 and the micro pores 6.

A catalyst layer 7 is coated on the walls of all the exhaust gas channels (i.e., exhaust gas inflow channels 2, exhaust gas outflow channels 3 and micro pores 6) in the body of the filter 1. However, it is not necessarily required to form the catalyst layer on the walls of the exhaust gas outflow channels 3.

A description is given below of Embodiments 1 to 5 having different catalyst materials used for their respective catalyst layers 7.

Embodiment 1

Figure 5:
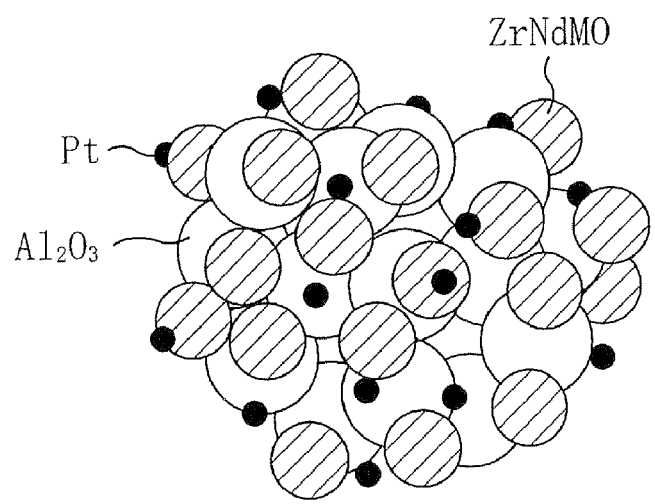
FIG. 5 is a schematic view showing a catalyst particle according to Embodiment 1.

A feature of this embodiment is that the catalyst layer 7 contains catalyst particles (a catalyst material) as schematically shown in FIG. 5. Specifically, the catalyst particle is formed so that primary particles of a ZrNd-based mixed oxide containing Zr, Nd and a rare earth metal M other than Ce and Nd (hatched particles; ZrNdMO) are dispersedly carried on the surface of a secondary particle formed by cohesion of primary particles of activated alumina (particles indicated by unfilled circles; $Al_2O_3$). Pt particles (indicated by filled circles) are carried as a catalytic metal on primary particles of the activated alumina ($Al_2O_3$) and primary particles of the ZrNd-based mixed oxide (ZrNdMO). The primary particles of activated alumina have a mean particle size of 1 to 100 nm (i.e., not smaller than 1 nm but not greater than 100 nm), the secondary particles of activated alumina have 200 to 500 nm and the primary particles of the ZrNd-based mixed oxide have a mean particle size of 5 to 50 nm.

<Preparation of Catalyst Material>

The catalyst material for conversion of exhaust gas components can be prepared according to the following method.

—Preparation of Activated Alumina Particle Precursor—

First, a source solution containing Al ions and La ions is prepared. Aluminium nitrate enneahydrate and lanthanum nitrate hexahydrate can be used as source materials for Al and La, respectively. Respective given amounts of the Al source material and the La source material are mixed with water to prepare a source solution having acidity.

A basic solution is added to the source solution and mixed to produce precipitated particles of an Al—La mixed hydroxide that is a precursor of activated alumina primary particles. In this case, for example, the source solution is stirred at room temperature for about one hour and aqueous ammonia at a concentration of about 7%, for example, is then mixed as the basic solution to the source solution. Instead of the aqueous ammonia, another basic solution, such as an aqueous solution of caustic soda, may be used.

—Rinsing and Dehydration—

The solution containing the precipitate of the activated alumina particle precursor is subjected to centrifugation to remove the supernatant liquid. Ion-exchanged water is further added to the dehydrated precipitate obtained by the removal of the supernatant liquid, stirred and subjected to centrifugation (dehydrated) again. This cycle of rinsing and dehydration is repeated several times. By repeating the cycle of rinsing and dehydration, the remaining basic solution is removed.

—Drying and Calcining—

The dehydrated precipitate is dried, then calcined and ground. The drying can be implemented, for example, by keeping the dehydrated precipitate at a temperature of about 100° C. to about 250° C. for a predetermined time in the atmospheric environment. The calcining can be implemented, for example, by keeping the dehydrated precipitate at a temperature of about 400° C. to about 600° C. for several hours in the atmospheric environment. Thus, powdered secondary particles are obtained in each of which primary particles of activated alumina containing $La_2O_3$ cohere together.

—Preparation of ZrNd-Based Mixed Oxide Particle Precursor—

First prepared is a solution in which the powdered secondary particles are dispersed in an acid solution containing Zr ions, Nd ions and ions of a rare earth metal M other than Ce and Nd. For this purpose, zirconium oxynitrate dihydrate and neodymium nitrate can be used as source materials for Zr and Nd, respectively. A nitrate salt of La, Pr or Y can be used as a source material for the rare earth metal M. Respective given amounts of the Zr source material, the Nd source material and the M source material are mixed with the powdered secondary particles and water.

Then, a basic solution is added to the above mixed solution and mixed to deposit a precipitate of Zr—Nd-M mixed hydroxide, which is a precursor of ZrNd-based mixed oxide primary particles, on the surfaces of the secondary particles. In this case, for example, the above mixed solution is stirred at room temperature for about one hour and aqueous ammonia at a concentration of about 7%, for example, is then mixed as the basic solution to the source solution. Instead of the aqueous ammonia, another basic solution, such as an aqueous solution of caustic soda, may be used.

—Rinsing and Dehydration—

The solution containing a precipitate of ZrNd-based mixed oxide particle precursor deposited on the surfaces of the secondary particles is subjected to centrifugation to remove the supernatant liquid. Ion-exchanged water is further added to the dehydrate obtained by the removal of the supernatant liquid, stirred and subjected to centrifugation (dehydrated) again. This cycle of rinsing and dehydration is repeated several times. By repeating the cycle of rinsing and dehydration, the remaining basic solution is removed.

—Drying and Calcining—

The dehydrate (secondary particles on the surfaces of which the precipitate of the ZrNd-based mixed oxide particle precursor is deposited) is dried, then calcined and ground. The drying can be implemented, for example, by keeping the dehydrate at a temperature of about 100° C. to about 250° C. for a predetermined time in the atmospheric environment. The calcining can be implemented, for example, by keeping the dehydrate at a temperature of about 400° C. to about 600° C. for several hours in the atmospheric environment. Thus, a powdered support material is obtained in which primary particles of the ZrNd-based mixed oxide are dispersedly carried on the surface of each secondary particle.

—Carrying of Catalytic Metal on Support Material—

The obtained powdered support material is mixed with a catalytic metal solution containing catalytic metal ions and then evaporated to dryness to obtain a dried residue. The residue is ground. Thus, a catalyst material composed of catalyst particles as shown in FIG. 5 is obtained. Examples of the catalytic metal solution used include a precious metal solution, such as a solution of diamminedinitro platinum nitrate or an aqueous solution of palladium nitrate. To obtain a catalyst material, the powdered support material may be impregnated with the catalytic metal solution, dried and calcined.

<Preferred ZrNd-Based Mixed Oxide Particle>

A description is given below of a preferred composition of the ZrNd-based mixed oxide particle with reference to the following carbon burning property test in which carbon particulates were used as particulates.

—Preparation of Samples—

To determine a preferred composition of the ZrNd-based mixed oxide, various kinds of Zr-based mixed oxide powders using La, Pr and Y as the rare earth metal M and having different proportions of $Nd_2O_3$ and different proportions of rare earth metal M oxide were prepared. First, Pt-carried catalyst materials were prepared by mixing each kind of Zr-based mixed oxide powder with a solution of diamminedinitro platinum nitrate and ion-exchanged water, evaporating the mixture to dryness, then well drying it and calcining it at 500° C. for two hours in the atmospheric environment. Note that the catalyst materials contained no activated alumina.

Then, samples (catalyst-supported particulate filters) were obtained by mixing each of the obtained catalyst materials with a binder and ion-exchanged water into a slurry, coating the slurry on a support for a filter made of silicon carbide (SiC) having a volume of 25 mL, a cell wall thickness of 16 mil ($406.4 \times 10^{-3}$ mm) and 178 cpsi (i.e., the number of cells per square inch (645.16 $mm^2$)), then drying it and calcining it by keeping it at 500° C. for two hours in the atmospheric environment. The amount of each Zr-based mixed oxide powder carried per L of filter was 50 g/L, and the amount of Pt carried per L (liter) of filter was 0.5 g/L. Then, each sample was heat aged by keeping it at 800° C. for 24 hours in the atmospheric environment.

Next, 10 mL ion-exchanged water was added to an amount of carbon (carbon black) corresponding to 10 g per L of filter and stirred for five minutes with a stirrer, thereby well dispersing carbon into the water. One end surface of each sample was dipped into the carbon-dispersed water and, concurrently, water in the sample was aspirated from the other end surface with an aspirator. Water having not been removed by the aspiration was removed by air blow from the one end surface and the sample was then put in a dry oven and dried therein by keeping it at 150° C. for two hours. Thus, carbon was deposited on the walls of exhaust gas channels in the sample filter.

—Carbon Burning Property Test—

The sample was attached to a fixed-bed, simulated gas flow reactor. In this state, simulated exhaust gas (composed of 10% $O_2$, 300 ppm NO, 10% $H_2O$ and $N_2$) was allowed to flow through the sample at a space velocity of 80000/h and, concurrently, the gas temperature at the catalyst sample entrance was increased at a rate of 15° C./min. Then, the amount of CO produced and the carbon burning rate at the time when the gas temperature reaches 590° C. were measured. The carbon burning rate was calculated based on the amounts of CO and $CO_2$ produced by carbon burning and according to the following equation. The measurement results are shown in Table 1.

Carbon burning rate (g/hr)={gas flow rate(L/hr)×
[(CO+CO$_2$) concentration (ppm)/(1×10$^6$)]}×12
(g/mol)/22.4(L/mol)

seen from the results of Samples 16 to 20, when the above total amount increased and the carbon burning rate increased accordingly, the amount of CO produced due to imperfect combustion of carbon tended to increase. Therefore, although it is advantageous in enhancing the particulate burning property that the proportion of the above total amount is high, the proportion is preferably less than 45% by mole (i.e., the proportion of $ZrO_2$ in each ZrNd-based mixed oxide particle is preferably 55% by mole or more) in order to restrain the increase in the amount of CO produced. More preferably, the proportion is less than 40% by mole (i.e., the proportion of $ZrO_2$ is 60% by mole or more). Furthermore, it can be seen from the results of Samples 16 to 20 that when the proportion of $M_2O_3$, which is an oxide of the rare earth metal M, increased, the amount of CO produced tended to increase.

TABLE 1

| Sample Number | Nd oxide (% by mole) | M oxide (% by mole) | Type of M | Total amount (% by mole) | Carbon burning rate at 590° C. (g/hr) | Produced CO (ppm) |
|---|---|---|---|---|---|---|
| 1 | 12.0 | 0.0 | — | 12.0 | 0.70 | — |
| 2 | 20.0 | 0.0 | — | 20.0 | 0.71 | — |
| 3 | 0.0 | 12.0 | La | 12.0 | 0.68 | — |
| 4 | 0.0 | 12.0 | Pr | 12.0 | 0.69 | — |
| 5 | 6.0 | 6.0 | La | 12.0 | 0.72 | — |
| 6 | 6.0 | 12.0 | La | 18.0 | 0.72 | — |
| 7 | 12.0 | 3.0 | La | 15.0 | 0.74 | — |
| 8 | 12.0 | 6.0 | La | 18.0 | 0.79 | — |
| 9 | 12.0 | 12.0 | La | 24.0 | 0.75 | — |
| 10 | 18.0 | 6.0 | La | 24.0 | 0.78 | — |
| 11 | 18.0 | 12.0 | La | 30.0 | 0.77 | — |
| 12 | 6.0 | 6.0 | Pr | 12.0 | 0.71 | — |
| 13 | 6.0 | 12.0 | Pr | 18.0 | 0.77 | — |
| 14 | 12.0 | 3.0 | Pr | 15.0 | 0.72 | — |
| 15 | 12.0 | 6.0 | Pr | 18.0 | 0.74 | — |
| 16 | 12.0 | 12.0 | Pr | 24.0 | 0.82 | 4 |
| 17 | 12.0 | 18.0 | Pr | 30.0 | 0.87 | 5 |
| 18 | 12.0 | La: 3.0, Pr: 12.0 | La, Pr | 27.0 | 0.87 | 5 |
| 19 | 12.0 | La: 3.0, Pr: 18.0 | La, Pr | 33.0 | 1.10 | 8 |
| 20 | 18.0 | 12.0 | Pr | 30.0 | 0.91 | 8 |
| 21 | 6.0 | 6.0 | Y | 12.0 | 0.72 | — |
| 22 | 12.0 | 3.0 | Y | 15.0 | 0.73 | — |
| 23 | 12.0 | 6.0 | Y | 18.0 | 0.74 | — |
| 24 | 12.0 | 12.0 | Y | 24.0 | 0.77 | — |
| 25 | 18.0 | 12.0 | Y | 30.0 | 0.80 | — |

Table 1 shows that Samples 5, 12 and 21 containing a combination of La, Pr or Y with Nd exhibited higher carbon burning rates than Samples 3 and 4 containing no Nd. Therefore, it is can be said to be preferable that Nd is an essential ingredient for the ZrNd-based mixed oxide. However, in the case where only Nd is used as the rare earth metal as in Samples 1 and 2, the carbon burning rate did not increase with increasing amount of Nd. Therefore, it can be said to be preferable that the ZrNd-based mixed oxide contains Nd in combination with La, Pr or Y.

Comparison among the cases where the proportion of rare earth metal M oxide is low (among Samples 7, 14 and 22 and among Samples 8, 15 and 23) shows that the use of La as the rare earth metal M is more advantageous than the use of Pr or Y in increasing the carbon burning rate. On the other hand, comparison among the cases where the proportion of rare earth metal M oxide is high (between Samples 6 and 13 and among Samples 11, 20 and 25) shows that the use of Pr as the rare earth metal M is more advantageous than the use of La or Y in increasing the carbon burning rate.

Furthermore, as the proportion of the total amount of neodymium oxide and M oxide increased, the carbon burning rate generally increased, with minor exceptions. However, as Therefore, the proportion of $M_2O_3$ is preferably 20% by mole or less.

On the other hand, when the proportion of the above total amount was 10% by mole or more, good results were obtained. Furthermore, when it was over 20% by mole, the carbon burning rate generally became high. Therefore, it can be said to be preferable that the proportion of the above total amount is 20% by mole or more in enhancing the particulate burning property. Particularly, it is preferable to attain a proportion of the above total amount of 20% by mole or more while raising the proportion of neodymium oxide or praseodymium oxide.

Figure 6:
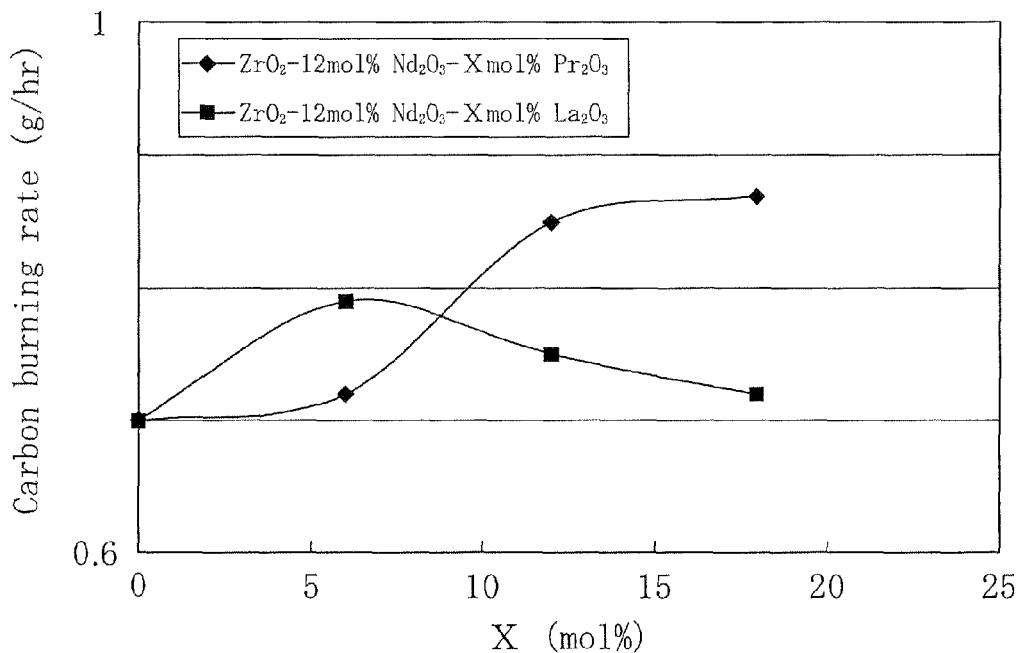
FIG. 6 is a graph showing the relation between carbon burning rate and the proportion of each of two kinds of rare earth metal M oxides in their respective ZrNd-based mixed oxides.

FIG. 6 shows results when samples obtained by coating different ZrNd-based mixed oxides using Pr or La as the rare earth metal M and containing no activated alumina on their respective SiC-made filter supports having the same cell wall thickness and number of cells but different from those of the samples in Table 1 were measured in terms of carbon burning rate at 590° C. under the same conditions as the above test on the samples in Table 1. Note that the proportion of $Nd_2O_3$ (hereinafter, referred to as "$Nd_2O_3$ ratio") was fixed at 12% by mole because Table 1 shows that the Zr-based mixed oxide exhibited good results when its $Nd_2O_3$ ratio was 18% by mole or smaller. The filter body had a volume of 25 mL, a cell wall thickness of 12 mil and 300 cpsi. Furthermore, like the above test, the amount of each ZrNd-based mixed oxide powder carried per L of filter was 50 g/L and the amount of Pt carried per L of filter was 0.5 g/L. Each sample was heat aged by keeping it at 800° C. for 24 hours in the atmospheric environment.

FIG. 6 shows that it is preferable that the Zr-based mixed oxide uses Pr as the rare earth metal M and has a proportion of $Pr_2O_3$ of 6% by mole or higher in order to increase the carbon burning rate. Furthermore, in the cases of use of La as the rare earth metal M, the carbon burning rate reached a peak value at a proportion of $La_2O_3$ of 6% by mole. However, when the proportion of $La_2O_3$ was near to 20% by mole, the carbon burning rate did not significantly differ from that when no La was added. Therefore, the proportion of $La_2O_3$ is preferably 20% by mole or less.

<Preferred Composition of Catalyst Particle>

A description is given below of a preferred composition of the catalyst particle with reference to the following carbon burning property test using carbon particulates as particulates and the following exhaust gas (HC and CO) conversion performance test.

—Preparation of Samples—

According to the above-stated method for preparing a catalyst material, various kinds of catalyst materials of inventive examples were prepared that had different proportions of $ZrO_2$ in ZrNd-based mixed oxide particle ($ZrO_2$/ZrNdMO shown in % by mole and hereinafter referred to as "$ZrO_2$ ratios") and different proportions of ZrNd-based mixed oxide particles in the total amount of each activated alumina secondary particle (having a proportion of $La_2O_3$ of 5% by mass) and the ZrNd-based mixed oxide particles (hereinafter referred to as "ZrNdMO ratios"). Pr was used as the rare earth metal M for the ZrNd-based mixed oxide particle and the proportion of $Pr_2O_3$ (hereinafter referred to as "$Pr_2O_3$ ratio") was fixed at 12% by mole. Furthermore, the catalytic metal Pt was carried on each support material by evaporation to dryness.

Furthermore, catalyst materials of comparative examples were obtained by preparing different kinds of ZrNd-based mixed oxide secondary particles having different $ZrO_2$ ratios and the same $Pr_2O_3$ ratio of 12% by mole by coprecipitation, physically mixing each of them with La-contained activated alumina secondary particles having a proportion of $La_2O_3$ of 5% by mass at an appropriate mixing ratio to obtain various kinds of powdered support materials and carrying Pt on each of them by evaporation to dryness.

The secondary particles of the ZrNd-based mixed oxide were prepared by obtaining a precursor of primary particles of the ZrNd-based mixed oxide by coprecipitation, subjecting it to rinsing, drying and calcining under the same conditions as the case of dispersive carrying of primary particles of the ZrNd-based mixed oxide on the surface of each activated alumina secondary particle, and then grinding it.

Then, according to the previously stated method for preparing a sample, samples (catalyst-supported particulate filters) were obtained by coating the catalyst materials of the inventive examples and comparative examples on their respective SiC-made filter supports having a volume of 25 mL, a cell wall thickness of 12 mil and 300 cpsi. The amount of each catalyst material carried per L of filter was 50 g/L, and the amount of Pt carried per L of filter was 1.0 g/L. Then, each sample was heat aged by keeping it at 800° C. for 24 hours in the atmospheric environment.

—Evaluation on Carbon Burning Property—

For each of the samples of the inventive examples and comparative examples, an amount of carbon (carbon black) corresponding to 10 g per L of filter was deposited on the walls of exhaust gas channels in the sample and the sample was then measured in terms of carbon burning rate at 590° C. according to the above-stated carbon burning property test. The measurement results on the inventive examples and the measurement results on the comparative examples are shown in Tables 2 and 3, respectively.

Hereinafter, each of the samples of the inventive examples and comparative examples shown in Tables 2 and 3 was identified by a combination of a number given to the $ZrO_2$ ratio of the sample and a sign (alphabetical letter) given to the ZrNdMO ratio of the sample. For example, the inventive example having a $ZrO_2$ ratio of 75% by mole (corresponding to the number "2") and a ZrNdMO ratio of 50% by mass (corresponding to the letter "c") is referred to as "Inventive Example 2c". This applies also to Tables 4 to 9, Tables 12 to 17 and Tables 20 to 23 described later.

TABLE 2

Inventive Example; Carbon burning rate (g/hr, 590° C.)

| | | | $ZrO_2$/ZrNdMO ratio | | | |
|---|---|---|---|---|---|---|
| | | | No. 1 55% by mole | No. 2 75% by mole | No. 3 80% by mole | No. 4 90% by mole |
| ZrNdMO/ (ZrNdMO + $Al_2O_3$) ratio | a | 25% by mass | 1.02 | 0.94 | 0.87 | |
| | b | 35% by mass | 1.05 | 0.95 | 0.88 | 0.78 |
| | c | 50% by mass | 0.99 | 0.92 | 0.86 | |
| | d | 75% by mass | 0.87 | 0.84 | 0.82 | |
| | e | 90% by mass | 0.81 | 0.78 | 0.78 | |

Primary particles of mixed oxide ZrNdMO are carried on each secondary particle of activated alumina.

TABLE 3

Comparative Example; Carbon burning rate (g/hr, 590° C.)

| | | | $ZrO_2$/ZrNdMO ratio | | | |
|---|---|---|---|---|---|---|
| | | | No. 1 55% by mole | No. 2 75% by mole | No. 3 80% by mole | No. 4 90% by mole |
| ZrNdMO/ (ZrNdMO + $Al_2O_3$) ratio | a | 25% by mass | 0.96 | | | |
| | b | 35% by mass | 0.95 | 0.87 | 0.82 | 0.78 |
| | c | 50% by mass | 0.91 | | | |
| | d | 75% by mass | 0.82 | | | |
| | e | 90% by mass | 0.75 | | | |

Activated alumina secondary particles and mixed oxide ZrNdMO secondary particles are mixed.

Reference to the inventive examples (Tables 2) shows that when the $ZrO_2$ ratio was 55% by mole and the ZrNdMO ratio was 35% by mass, the highest carbon burning rate was reached. Comparison between the inventive examples (Table 2) and their comparative examples (Table 3) when the $ZrO_2$ ratio was 55% by mole shows that the inventive examples exhibited higher carbon burning rates at all of the ZrNdMO ratios than the comparative examples. On the other hand, comparison between the inventive examples (Table 2) and their comparative examples (Table 3) when the ZrNdMO ratio was 35% by mass shows that the inventive example at a $ZrO_2$ ratio of 90% by mole had the same carbon burning rate as its comparative example at the same $ZrO_2$ ratio but the other inventive examples at the other $ZrO_2$ ratios exhibited higher carbon burning rates than their comparative examples.

The reason for these results can be considered to be that since in the inventive examples each kind of ZrNd-based mixed oxide was dispersedly carried in the form of primary particles of small particle size on the surface of each secondary particle of activated alumina, the amount of oxygen ions supplied by the ZrNd-based mixed oxide increased and the ZrNd-based mixed oxide primary particles were less likely to cause a cohesion due to heat, i.e., the heat resistance of the catalyst material increased.

Figure 7:
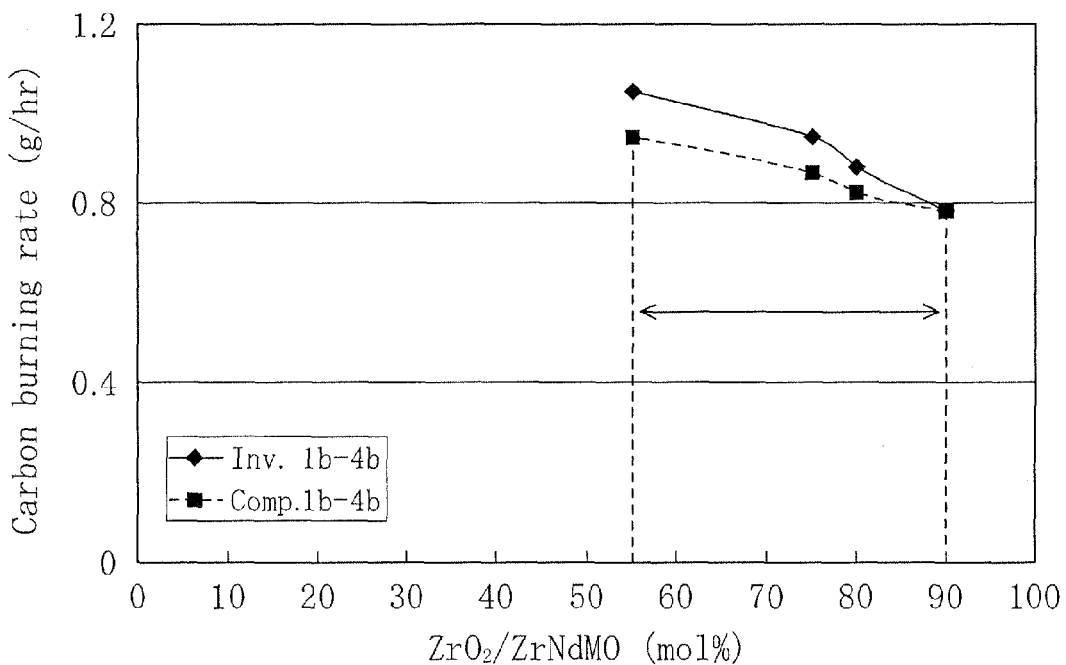
FIG. 7 is a graph showing the relation between carbon burning rate and the $ZrO_2$ ratio of each of ZrNd-based mixed oxides of inventive examples according to Embodiment 1 and their comparative examples.

In this context, graphically shown in FIG. 7 are the carbon burning rates of Inventive Examples 1b, 2b, 3b and 4b and Comparative Examples 1b, 2b, 3b and 4b having a fixed ZrNdMO ratio of 35% by mass and different $ZrO_2$ ratios. Furthermore, graphically shown in FIG. 8 are the carbon burning rates of Inventive Examples 1a to 1e and Comparative Examples 1a to 1e having a fixed $ZrO_2$ ratio of 55% by mole and different ZrNdMO ratios.

Reference to FIG. 7 shows that when the $ZrO_2$ ratio was 55% by mole inclusive to 90% by mole exclusive, the inventive examples had higher carbon burning rates than their comparative examples and that particularly when the $ZrO_2$ ratio was 55% to 80% by mole, both inclusive, the inventive examples exhibited relatively significant differences in carbon burning rate from their comparative examples.

Figure 8:
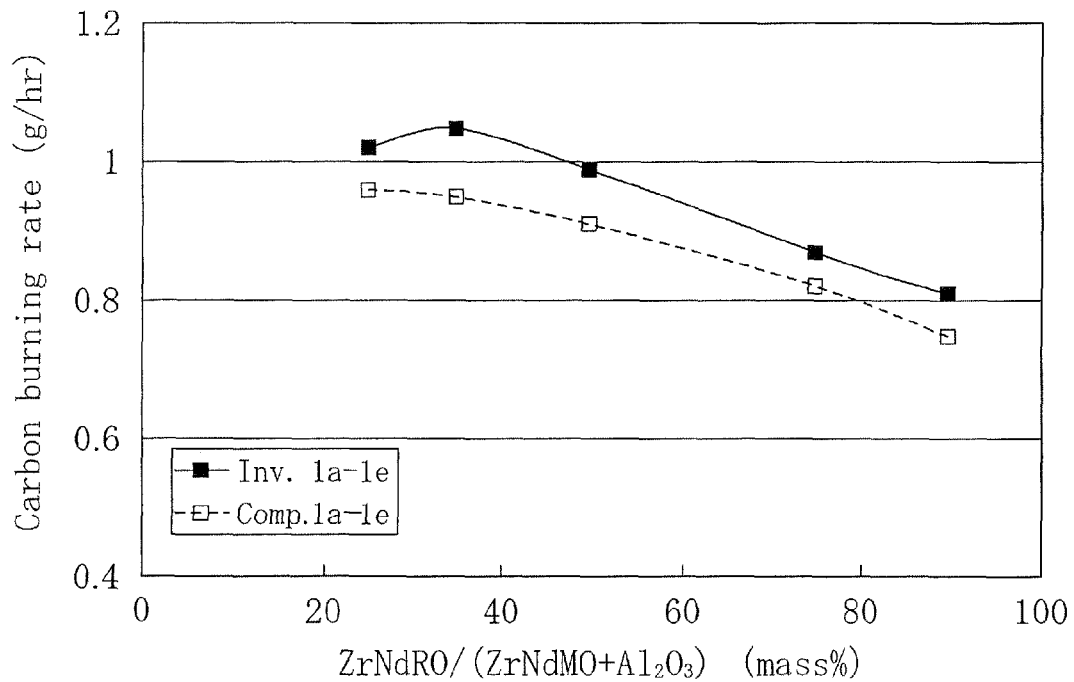
FIG. 8 is a graph showing the relation between carbon burning rate and the ZrNdMO ratio of each of inventive examples according to Embodiment 1 and their comparative examples.

Reference to FIG. 8 shows that when the ZrNdMO ratio was 25% to 90% by mass, both inclusive, the inventive examples had higher carbon burning rates than their comparative examples and that even when the ZrNdMO ratio was 20% by mass, the inventive example can be expected to have a higher carbon burning rate than its comparative example. Furthermore, FIG. 8 shows that particularly when the ZrNdMO ratio was 25% to 50% by mass, both inclusive, the inventive examples exhibited relatively high carbon burning rates.

—Evaluation of Light-Off Performance for Exhaust Gas Conversion—

Each of the samples of the inventive examples and comparative examples was measured in terms of light-off performance for conversion of HC and CO in exhaust gas, unlike the above carbon burning property test, without deposition of carbon black. Specifically, the sample was set to a simulated gas flow reactor. In this state, simulated exhaust gas (composed of 10% $O_2$, 10% $H_2O$, 100 ppm NO, 200 ppmC $C_3H_6$, 400 ppm CO and $N_2$) was allowed to flow through the sample at a space velocity of 50000/h and, concurrently, the gas temperature at the catalyst sample entrance was increased at a rate of 15° C./min. Then obtained was the gas temperature T50 (° C.) at the catalyst sample entrance when the concentration of each of exhaust gas components (HC and CO) detected downstream of the sample reaches half of that of the corresponding exhaust gas component flowing into the sample (when the conversion efficiency reaches 50%). The measurement results on the inventive examples and the measurement results on the comparative examples are shown in Tables 4 and 5, respectively.

TABLE 4

| | | | Inventive Example; Light-off temperature T50 (° C.) | | | | | | | |
|---|---|---|---|---|---|---|---|---|---|---|
| | | | $ZrO_2$/ZrNdMO ratio | | | | | | | |
| | | | No. 1 55% by mole | | No. 2 75% by mole | | No. 3 80% by mole | | No. 4 90% by mole | |
| | | | HC | CO | HC | CO | HC | CO | HC | CO |
| ZrNdMO/ (ZrNdMO + $Al_2O_3$) ratio | a | 25% by mass | 211 | 196 | 219 | 204 | 226 | 211 | | |
| | b | 35% by mass | 211 | 195 | 220 | 204 | 226 | 210 | 230 | 214 |
| | c | 50% by mass | 213 | 197 | 221 | 204 | 226 | 210 | | |
| | d | 75% by mass | 218 | 204 | 223 | 210 | 228 | 215 | | |
| | e | 90% by mass | 224 | 209 | 226 | 215 | 231 | 220 | | |

Primary particles of mixed oxide ZrNdMO are carried on each secondary particle of activated alumina.

TABLE 5

| | | | Comparative Example; Light-off temperature T50 (° C.) | | | | | | | |
|---|---|---|---|---|---|---|---|---|---|---|
| | | | $ZrO_2$/ZrNdMO ratio | | | | | | | |
| | | | No. 1 55% by mole | | No. 2 75% by mole | | No. 3 80% by mole | | No. 4 90% by mole | |
| | | | HC | CO | HC | CO | HC | CO | HC | CO |
| ZrNdMO/ (ZrNdMO + $Al_2O_3$) ratio | a | 25% by mass | 215 | 200 | 223 | 206 | 224 | 207 | 225 | 206 |
| | b | 35% by mass | 216 | 201 | 225 | 208 | 226 | 209 | 228 | 211 |

TABLE 5-continued

Comparative Example; Light-off temperature T50 (° C.)

| | | $ZrO_2$/ZrNdMO ratio | | | | | | | |
|---|---|---|---|---|---|---|---|---|---|
| | | No. 1 55% by mole | | No. 2 75% by mole | | No. 3 80% by mole | | No. 4 90% by mole | |
| | | HC | CO | HC | CO | HC | CO | HC | CO |
| c | 50% by mass | 217 | 203 | | | | | | |
| d | 75% by mass | 222 | 208 | | | | | | |
| e | 90% by mass | 228 | 213 | | | | | | |

Activated alumina secondary particles and mixed oxide ZrNdMO secondary particles are mixed.

Reference to Tables 4 and 5 shows that when the $ZrO_2$ ratio was 55% by mole, the inventive examples exhibited lower light-off temperatures at all of the ZrNdMO ratios than their comparative examples. Furthermore, when the ZrNdMO ratio was 25% and 35% by mass, the inventive examples generally exhibited lower light-off temperatures than their comparative examples, except for when the $ZrO_2$ ratio was large. The reason for these results can also be considered to be that the inventive examples increased the amount of oxygen ions supplied and the heat resistance as compared to the comparative examples.

Figure 9:
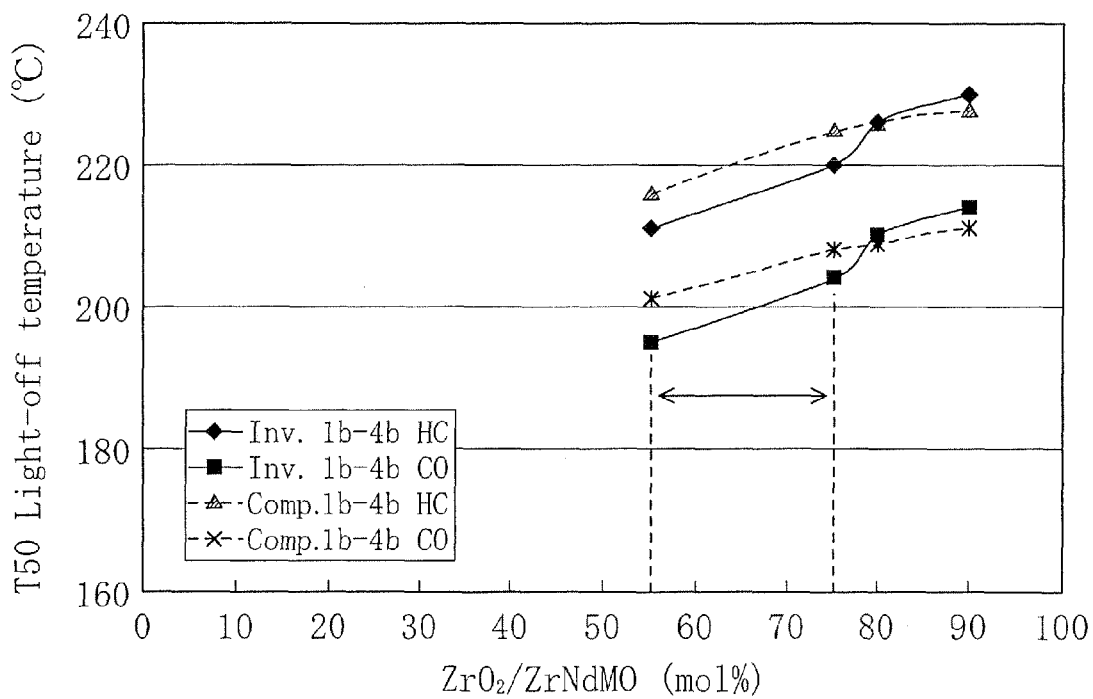
FIG. 9 is a graph showing the relation between light-off temperature and the $ZrO_2$ ratio of each of ZrNd-based mixed oxides of inventive examples according to Embodiment 1 and their comparative examples.

Graphically shown in FIG. 9 are the light-off temperatures of Inventive Examples 1b, 2b, 3b and 4b and Comparative Examples 1b, 2b, 3b and 4b having a fixed ZrNdMO ratio of 35% by mass and different $ZrO_2$ ratios. Furthermore, graphically shown in FIG. 10 are the light-off temperatures of Inventive Examples 1a to 1e and Comparative Examples 1a to 1e having a fixed $ZrO_2$ ratio of 55% by mole and different ZrNdMO ratios.

Reference to FIG. 9 shows that when the $ZrO_2$ ratio was 55% by mole inclusive to 80% by mole exclusive, the inventive examples had lower light-off temperatures for both of HC and CO than their comparative examples and that particularly when the $ZrO_2$ ratio was 55% to 75% by mole, both inclusive, the inventive examples exhibited low light-off temperatures.

Figure 10:
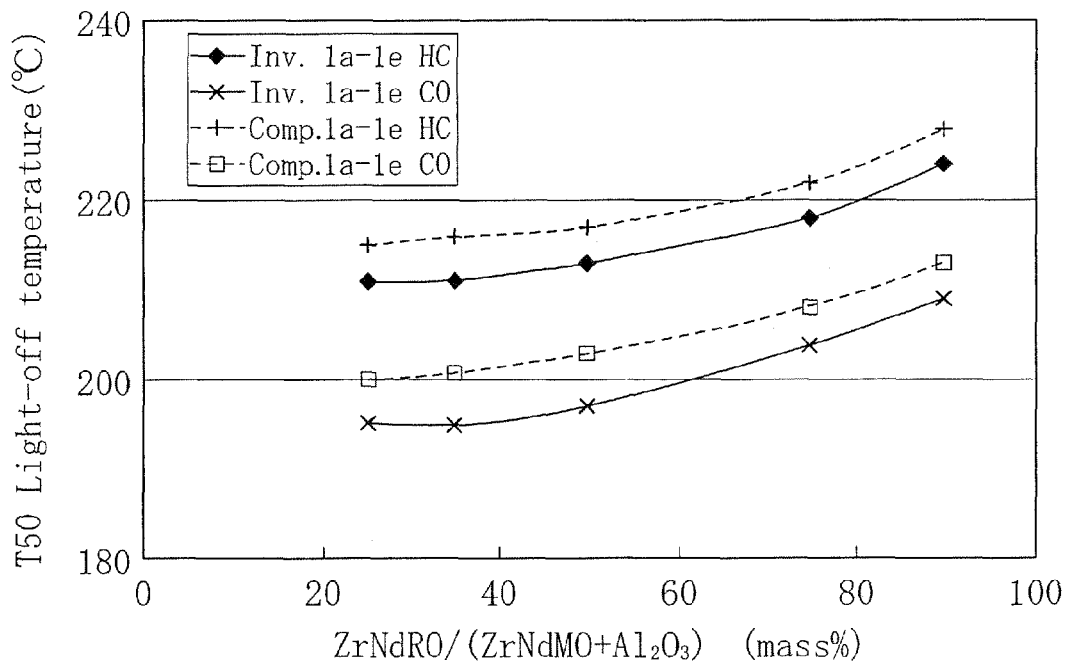
FIG. 10 is a graph showing the relation between light-off temperature and the ZrNdMO ratio of each of inventive examples according to Embodiment 1 and their comparative examples.

Reference to FIG. 10 shows that when the ZrNdMO ratio was 25% to 90% by mass, both inclusive, the inventive examples had lower light-off temperatures than their comparative examples and that even when the ZrNdMO ratio was 20% by mass, the inventive example can be expected to a lower light-off temperature than its comparative example. Furthermore, FIG. 10 shows that particularly when the ZrNdMO ratio was 25% to 50% by mass, both inclusive, the inventive examples exhibited relatively low light-off temperatures.

Embodiment 2

This embodiment is characterized in that each secondary particle on which ZrNd-based mixed oxide particles are carried is composed of primary particles of activated alumina and primary particles of a CeZr-based mixed oxide. The other structural features of the catalyst particle are the same as in Embodiment 1. In this case, primary particles of activated alumina and primary particles of the CeZr-based mixed oxide are mixed and cohere together to form a secondary particle. A catalytic metal is carried not only on primary particles of the ZrNd-based mixed oxide and primary particles of the activated alumina but also on primary particles of the CeZr-based mixed oxide. The primary particles of the CeZr-based mixed oxide have a mean particle size of 5 to 100 nm.

The CeZr-based mixed oxide particles contain Ce, Zr and, if necessary, a rare earth metal R other than Ce. Examples of the rare earth metal R include La, Nd, Pr, Sm, Gd and Y. What is preferable in enhancing the particulate burning property is the use of at least one element selected from the group consisting of Nd, La, Pr and Y.

A description is given below of the case of using CeZr-based mixed oxide particles containing the rare earth metal R.

<Preparation of Catalyst Material>

The catalyst material for conversion of exhaust gas components in this embodiment can be prepared according to the following method.

—Preparation of Activated Alumina Particle Precursor—

A solution in which a precipitate of an activated alumina particle precursor is produced is prepared according to the method described in <Preparation of Catalyst Material> in Embodiment 1.

—Preparation of CeZr-Based Mixed Oxide Particle Precursor—

First, a source solution containing Ce ions, Zr ions and ions of a rare earth metal R other than Ce is prepared. For this purpose, cerium nitrate (III) hexahydrate and Zirconium oxynitrate dihydrate can be used as source materials for Ce and Zr, respectively. A nitrate salt of Nd, La, Pr or Y can be used as a source material for the rare earth metal R other than Ce. Respective given amounts of the Ce source material, the Zr source material and the R source material are mixed with water to prepare a source solution having acidity.

Then, a basic solution is added to the source solution and mixed to produce precipitated particles of a Ce—Zr—R mixed hydroxide that is a precursor of CeZr-based mixed oxide primary particles. In this case, for example, the source solution is stirred at room temperature for about one hour and aqueous ammonia at a concentration of about 7%, for example, is then mixed as the basic solution to the source solution. Instead of the aqueous ammonia, another basic solution, such as an aqueous solution of caustic soda, may be used.

—Mixing of Activated Alumina Particle Precursor and CeZr-Based Mixed Oxide Particle Precursor—

The activated alumina particle precursor and the CeZr-based mixed oxide particle precursor, which are obtained in the above steps, are mixed. Specifically, a solution containing a precipitate of the activated alumina particle precursor is mixed with a solution containing a precipitate of the CeZr-based mixed oxide particle precursor. In this case, the three solutions are previously formulated to have the same pH.

—Rinsing and Dehydration—

The mixed solution containing a precipitate of the activated alumina particle precursor and the CeZr-based mixed oxide particle precursor is subjected to centrifugation to remove the supernatant liquid. Ion-exchanged water is further added to the dehydrated precipitate obtained by the removal of the supernatant liquid, stirred and subjected to centrifugation (dehydrated) again. This cycle of rinsing and dehydration is repeated several times. By repeating the cycle of rinsing and dehydration, the remaining basic solution is removed.

—Drying and Calcining—

The dehydrated precipitate is dried, then calcined and ground. The drying can be implemented, for example, by keeping the dehydrated precipitate at a temperature of about 100° C. to about 250° C. for a predetermined time in the atmospheric environment. The calcining can be implemented, for example, by keeping the dehydrated precipitate at a temperature of about 400° C. to about 600° C. for several hours in the atmospheric environment. Thus, powdered secondary particles are obtained in each of which primary particles of activated alumina and primary particles of the CeZr-based mixed oxide are mixed and cohere together.

—Carrying of ZrNd-Based Mixed Oxide Particles on Secondary Particle—

Like Embodiment 1, first prepared is a source solution in which the powdered secondary particles are dispersed in an acid solution containing Zr ions, Nd ions and ions of a rare earth metal M other than Ce and Nd. A basic solution is then added to the source solution and mixed to deposit a precipitate of a ZrNd-based mixed oxide particle precursor on the surfaces of the secondary particles. Then, by carrying out the rinsing and dehydration step and the drying and calcining step in this order, a powdered support material is obtained in which primary particles of the ZrNd-based mixed oxide are dispersedly carried on the surface of each of the secondary particles.

—Carrying of Catalytic Metal on Support Material—

The obtained powdered support material is mixed with a catalytic metal solution containing catalytic metal ions and then evaporated to dryness to obtain a dried residue. The residue is ground. Thus, a catalyst material according to this embodiment is obtained. Examples of the catalytic metal solution used include a precious metal solution, such as a solution of diamminedinitro platinum nitrate or an aqueous solution of palladium nitrate. To obtain a catalyst material, the powdered support material may be impregnated with the catalytic metal solution, dried and calcined.

<Preferred CeZr-Based Mixed Oxide Particle>

A description is given below of a preferred composition of the CeZr-based mixed oxide particle with reference to the following carbon burning property test in which carbon particulates were used as particulates.

—Preparation of Samples—

Prepared were various kinds of powdered CeZr-based mixed oxides (CeZrRO) containing different kinds and proportions of rare earth metals R. The molar ratio between $CeO_2$ and $ZrO_2$ was 1:3. First, Pt-carried catalyst materials were prepared by mixing each kind of mixed oxide powder with a solution of diamminedinitro platinum nitrate and ion-exchanged water, evaporating the mixture to dryness, then well drying it and calcining it at 500° C. for two hours in the atmospheric environment. Note that the catalyst materials contained no activated alumina.

Then, samples (catalyst-supported particulate filters) were obtained by mixing each of the obtained catalyst materials with a binder and ion-exchanged water into a slurry, coating the slurry on a support (filter body) for a filter made of SiC having a volume of 25 mL, a cell wall thickness of 12 mil ($304.8 \times 10^{-3}$ mm) and 300 cpsi (i.e., the number of cells per square inch (645.16 $mm^2$)), then drying it and calcining it by keeping it at 500° C. for two hours in the atmospheric environment. The amount of each CeZr-based mixed oxide powder carried per L of filter was 50 g/L, and the amount of Pt carried per L of filter was 0.5 g/L. Then, each sample was heat aged by keeping it at 800° C. for 24 hours in the atmospheric environment.

Figure 11:
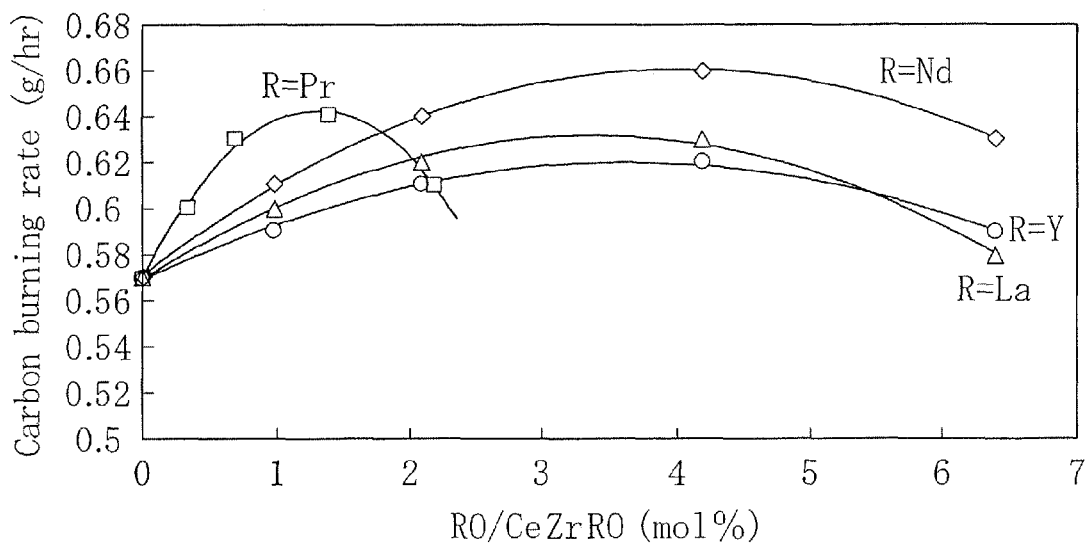
FIG. 11 is a graph showing the relation between carbon burning rate and the proportion of each of various kinds of rare earth metal R oxides in their respective CeZr-based mixed oxides in Embodiment 2.

Next, like Embodiment 1, an amount of carbon corresponding to 10 g per L of filter was deposited on the walls of exhaust gas channels in each sample and the sample was then measured in terms of carbon burning rate at 590° C. under the same conditions as in Embodiment 1. The measurement results are shown in FIG. 11. The abscissa of FIG. 11 represents the proportion (% by mole) of rare earth metal oxide RO in each CeZr-based mixed oxide.

FIG. 11 shows that when the rare earth metal R was Pr, relatively high carbon burning rates were reached at small proportions of the rare earth metal oxide RO of 0.3% to 2% by mole and that when the rare earth metal R was Nd, La or Y, relatively high carbon burning rates were reached at proportions of the rare earth metal oxide RO of 1% to 7% by mole or 1% to 6% by mole. Furthermore, it can be said that, among the four kinds of rare earth metals, the use of Nd is most advantageous in enhancing the carbon burning property and that the $Nd_2O_3$ ratio is preferably 4% by mole.

<$CeO_2$ Ratio of CeZr-Based Mixed Oxide and $ZrO_2$ Ratio of ZrNd-Based Mixed Oxide>

—Preparation of Samples—

According to the above method for preparing a catalyst material, a plurality of kinds of catalyst materials of inventive examples were prepared that had a fixed $Al_2O_3$:ZrNdMO:CeZrRO mass ratio among activated alumina, ZrNd-based mixed oxide and CeZr-based mixed oxide of 66:22:12, different proportions of $CeO_2$ in CeZr-based mixed oxide (hereinafter referred to as "$CeO_2$ ratios") and different proportions of $ZrO_2$ in ZrNd-based mixed oxide (i.e., different $ZrO_2$ ratios). The catalyst materials of the inventive examples are materials in each of which Pt is carried on a powdered support material. The support material is a material in which primary particles of a ZrNd-based mixed oxide are dispersedly carried on the surface of each secondary particle. The secondary particle is formed so that activated alumina particles and CeZr-based mixed oxide particles are mixed and cohere together.

Furthermore, a plurality of kinds of catalyst materials of comparative examples were likewise prepared that had a fixed $Al_2O_3$:ZrNdMO:CeZrRO ratio of 66:22:12, different proportions of $CeO_2$ in CeZr-based mixed oxide (i.e., different $CeO_2$ ratios) and different proportions of $ZrO_2$ in ZrNd-based mixed oxide (i.e., different $ZrO_2$ ratios). Each catalyst material is a material in which Pt is carried on a powdered support material obtained by physically mixing activated alumina secondary particles, CeZr-based mixed oxide secondary particles and ZrNd-based mixed oxide secondary particles.

Then, samples (catalyst-supported particulate filters) of inventive and comparative examples were obtained by coating the catalyst materials of the inventive examples and comparative examples on their respective SiC-made filter supports (filter bodies) having a volume of 25 mL, a cell wall thickness of 12 mil and 300 cpsi. In each of the samples of the inventive and comparative examples, the amount of catalyst material carried per L of filter was 50 g/L, the amount of Pt carried per L of filter was 1.0 g/L, activated alumina contained La to attain a proportion of $La_2O_3$ of 5% by mass, the CeZr-based mixed oxide contained Nd as the rare earth metal R to attain a proportion of $Nd_2O_3$ of 4% by mole and the ZrNd-based mixed oxide contained Pr as the rare earth metal M to attain a proportion of $Pr_2O_3$ of 12% by mole.

—Evaluation on Carbon Burning Property—

Then, each of the samples of the inventive examples and comparative examples was heat aged in the above-stated manner, carbon was deposited on the walls of exhaust gas channels in the sample in the above-stated manner and the sample was then measured in terms of carbon burning rate at 590° C. according to the above-stated carbon burning property test. The measurement results on the inventive examples and the measurement results on the comparative examples are shown in Tables 6 and 7, respectively.

TABLE 6

Inventive Example; Carbon burning rate (g/hr, 590° C.)

| | | | $ZrO_2$/ZrNdMO ratio | | | |
|---|---|---|---|---|---|---|
| | | | No. 1 55% by mole | No. 2 75% by mole | No. 3 80% by mole | No. 4 90% by mole |
| $CeO_2$/ CeZrRO ratio | a | 10% by mole | 1.01 | 0.95 | 0.82 | |
| | b | 20% by mole | 1.16 | 1.06 | 0.87 | 0.8 |
| | c | 45% by mole | 1.11 | 1.08 | 0.9 | 0.82 |
| | d | 60% by mole | 0.94 | 0.89 | | |
| | e | 80% by mole | 0.89 | 0.86 | | |

Primary particles of mixed oxide ZrNdMO are carried on each secondary particle composed of activated alumina primary particles and mixed oxide CeZrRO primary particles.

TABLE 7

Comparative Example; Carbon burning rate (g/hr, 590° C.)

| | | | $ZrO_2$/ZrNdMO ratio | | | |
|---|---|---|---|---|---|---|
| | | | No. 1 55% by mole | No. 2 75% by mole | No. 3 80% by mole | No. 4 90% by mole |
| $CeO_2$/ CeZrRO ratio | a | 10% by mole | 1.05 | 1.02 | | |
| | b | 20% by mole | 1.08 | 1.05 | 0.92 | |
| | c | 45% by mole | 1.06 | 0.99 | | |
| | d | 60% by mole | 0.96 | | | |

TABLE 7-continued

Comparative Example; Carbon burning rate (g/hr, 590° C.)

| | | | $ZrO_2$/ZrNdMO ratio | | | |
|---|---|---|---|---|---|---|
| | | | No. 1 55% by mole | No. 2 75% by mole | No. 3 80% by mole | No. 4 90% by mole |
| | e | 80% by mole | 0.94 | | | |

Activated alumina secondary particles, mixed oxide CeZrRO secondary particles and mixed oxide ZrNdMO secondary particles are mixed.

Since the inventive examples of Embodiment 2 have a $Al_2O_3$:ZrNdMO:CeZrRO mass ratio of 66:22:12, their ZrNdMO/($Al_2O_3$+ZeNdMO) mass ratio is 25% by mass. Therefore, the inventive examples of this embodiment correspond to Inventive Examples 1a and 2a of Embodiment 1 shown in Table 2. Comparison of the inventive examples shown in Table 6 with Inventive Examples 1a and 2a shown in Table 2 shows that at a $ZrO_2$ ratio of 55% by mole, the inventive examples (Table 6) of Embodiment 2 exhibited higher carbon burning rates than Inventive Example 1a in Table 2 at $CeO_2$ ratios of 20% and 45% by mole and that also at a $ZrO_2$ ratio of 75% by mole, the inventive examples of Embodiment 2 exhibited higher carbon burning rates than Inventive Example 2a in Table 2 at $CeO_2$ ratios of 20% and 45% by mole. These results are due to the oxygen storage/release capacity of CeZr-based mixed oxide primary particles contained in each secondary particle of Embodiment 2.

On the other hand, comparison of the inventive examples (Table 6) of Embodiment 2 with their comparative examples (Table 7) shows that when the $CeO_2$ ratio of the CeZr-based mixed oxide was 20% to 45% by mole, both inclusive, and the $ZrO_2$ ratio of the ZrNd-based mixed oxide was 55% to 75% by mole, both inclusive, the inventive examples exhibited better results than the comparative examples. It can be said from the above that the effectiveness of the combination of ZrNd-based mixed oxide primary particles and a secondary particle of a mixture of activated alumina particles and CeZr-based mixed oxide particles in enhancing the carbon burning rate is a specific phenomenon within the above range of $CeO_2$ ratios and the above range of $ZrO_2$ ratios.

—Evaluation of Light-Off Performance for Exhaust Gas Conversion—

Each of the samples of the inventive examples and comparative examples was heat aged in the above-stated manner and then measured in terms of light-off temperature for conversion of HC and CO according to the above-stated light-off performance evaluation test, without deposition of carbon thereon. The measurement results on the inventive examples and the measurement results on the comparative examples are shown in Tables 8 and 9, respectively.

TABLE 8

Inventive Example; Light-off temperature T50 (° C.)

| | | | ZrO$_2$/ZrNdMO ratio | | | | | | |
|---|---|---|---|---|---|---|---|---|---|
| | | | No. 1 55% by mole | | No. 2 75% by mole | | No. 3 80% by mole | | No. 4 90% by mole | |
| | | | HC | CO | HC | CO | HC | CO | HC | CO |
| CeO$_2$/CeZrRO ratio | a | 10% by mole | 209 | 196 | 214 | 206 | | | | |
| | b | 20% by mole | 204 | 190 | 207 | 192 | 216 | 204 | 220 | 210 |
| | c | 45% by mole | 203 | 188 | 206 | 189 | 215 | 203 | 219 | 206 |
| | d | 60% by mole | 211 | 198 | 217 | 200 | | | | |
| | e | 80% by mole | 215 | 202 | 221 | 209 | | | | |

Primary particles of mixed oxide ZrNdMO are carried on each secondary particle composed of activated alumina primary particles and mixed oxide CeZrRO primary particles.

TABLE 9

Comparative Example; Light-off temperature T50 (° C.)

| | | | ZrO$_2$/ZrNdMO ratio | | | | | | |
|---|---|---|---|---|---|---|---|---|---|
| | | | No. 1 55% by mole | | No. 2 75% by mole | | No. 3 80% by mole | | No. 4 90% by mole | |
| | | | HC | CO | HC | CO | HC | CO | HC | CO |
| CeO$_2$/CeZrRO ratio | a | 10% by mole | 208 | 194 | 213 | 201 | | | | |
| | b | 20% by mole | 208 | 194 | 210 | 196 | 215 | 202 | | |
| | c | 45% by mole | 209 | 195 | 211 | 197 | | | | |
| | d | 60% by mole | 210 | 196 | 215 | 201 | | | | |
| | e | 80% by mole | 212 | 199 | 218 | 206 | | | | |

Activated alumina secondary particles, mixed oxide CeZrRO secondary particles and mixed oxide ZrNdMO secondary particles are mixed.

Comparison of the inventive examples of Embodiment 2 shown in Table 8 with Inventive Examples 1a and 2a of Embodiment 1 shows that when the CeO$_2$ ratio of the CeZr-based mixed oxide was 20% to 45% by mole, both inclusive, and the ZrO$_2$ ratio of the ZrNd-based mixed oxide was 55% to 75% by mole, both inclusive, the inventive examples of Embodiment 2 exhibited better results on light-off performance than the above inventive examples of Embodiment 1.

On the other hand, comparison of the inventive examples (Table 8) of Embodiment 2 with their comparative examples (Table 9) shows that when the CeO$_2$ ratio of the CeZr-based mixed oxide was 20% to 45% by mole, both inclusive, and the ZrO$_2$ ratio of the ZrNd-based mixed oxide was 55% to 75% by mole, both inclusive, the inventive examples exhibited better results than the comparative examples. It can be said from the above that the effectiveness of the combination of ZrNd-based mixed oxide primary particles and a secondary particle of a mixture of activated alumina particles and CeZr-based mixed oxide particles in enhancing the light-off performance is a specific phenomenon within the above range of CeO$_2$ ratios and the above range of ZrO$_2$ ratios.

As can be seen from the description so far, when a secondary particle is formed by activated alumina primary particles and CeZr-based mixed oxide primary particles, it is preferable that the CeO$_2$ ratio of the CeZr-based mixed oxide is 20% to 45% by mole, both inclusive, and the ZrO$_2$ ratio of the ZrNd-based mixed oxide is 55% to 75% by mole, both inclusive.

<Ratio Among Activated Alumina, CeZr-Based Mixed Oxide and ZrNd-Based Mixed Oxide>

—Preparation of Samples—

According to the above method for preparing a catalyst material, four kinds of catalyst materials of inventive examples were prepared that had different Al$_2$O$_3$:ZrNdMO: CeZrRO mass ratios among activated alumina and ZrNd-based mixed oxide and CeZr-based mixed oxide. The catalyst materials of the inventive examples are materials in each of which Pt is supported on a powdered support material. The support material is a material in which primary particles of a ZrNd-based mixed oxide are dispersedly carried on the surface of each secondary particle. The secondary particle is formed so that activated alumina particles and CeZr-based mixed oxide particles are mixed and cohere together.

Furthermore, four kinds of catalyst materials of comparative examples were likewise prepared that had different mass ratios among activated alumina, ZrNd-based mixed oxide and CeZr-based mixed oxide. Each catalyst material is a material in which Pt is carried on a powdered support material obtained by physically mixing activated alumina secondary particles, CeZr-based mixed oxide secondary particles and ZrNd-based mixed oxide secondary particles.

Figure 12:
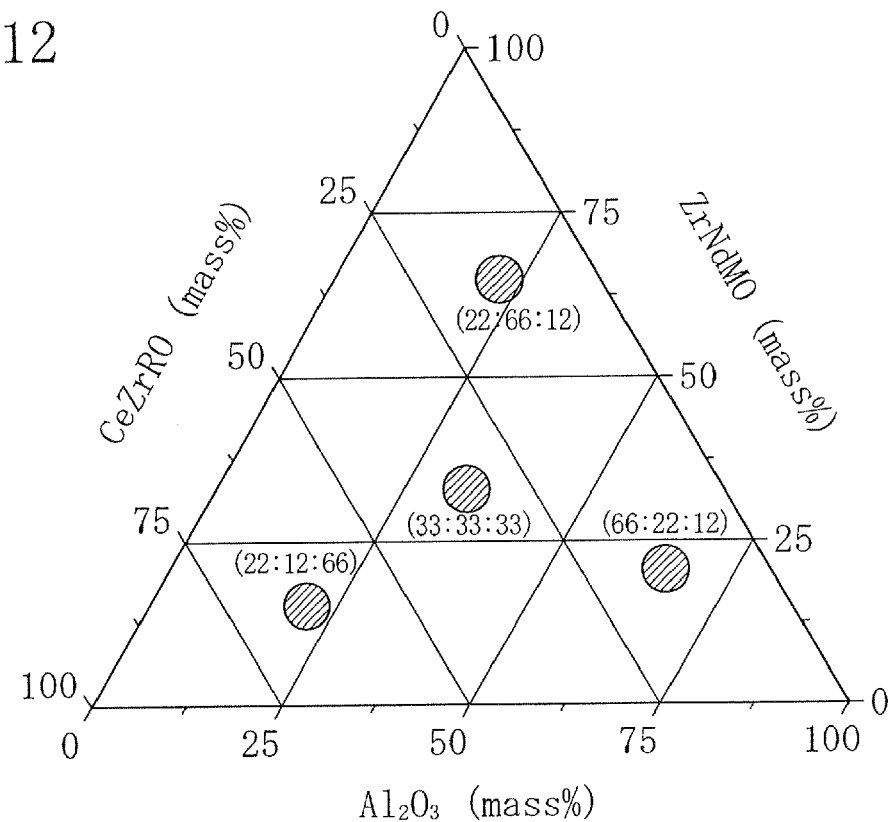
FIG. 12 is a triangular chart showing the mass ratio among activated alumina ($Al_2O_3$), ZrNd-based mixed oxide (ZrNdMO) and Ce-based mixed oxide (CeZrRO) in Embodiment 2.

The compositions of the four kinds of inventive examples and the four kinds of comparative examples are shown in the triangular chart of FIG. 12. Note that in FIG. 12 the value "33" at the center point (33:33:33) of the triangular chart should be strictly shown as "33+⅓" but is here shown as "33" for convenience.

Then, samples (catalyst-supported particulate filters) of inventive and comparative examples were obtained by coating the catalyst materials of the inventive examples and comparative examples on their respective SiC-made filter supports (filter bodies) having a volume of 25 mL, a cell wall thickness of 12 mil and 300 cpsi. In each of the samples of the inventive and comparative examples, the amount of catalyst material carried per L of filter was 50 g/L, the amount of Pt carried per L of filter was 1.0 g/L, activated alumina contained La to attain a proportion of $La_2O_3$ of 5% by mass, the CeZr-based mixed oxide was prepared to have a $CeO_2$:$ZrO_2$:$Nd_2O_3$ mole ratio of 20:76:4 and the ZrNd-based mixed oxide was prepared to have a $ZrO_2$:$Nd_2O_3$:$Pr_2O_3$ mole ratio of 55:33:12.

—Evaluation on Carbon Burning Property—

Then, each of the samples of the inventive examples and comparative examples was heat aged in the above-stated manner, carbon was deposited on the walls of exhaust gas channels in the sample in the above-stated manner and the sample was then measured in terms of carbon burning rate at 590° C. according to the above-stated carbon burning property test. The measurement results are shown in Table 10 and FIG. 13.

TABLE 10

| $Al_2O_3$:ZrNdMO:CeZrRO (mass ratio) | Carbon burning rate (g/hr) | |
|---|---|---|
| | Inventive Example | Comparative Example |
| 66:22:12 | 1.16 | 1.08 |
| 22:66:12 | 1.06 | 0.92 |
| 22:12:66 | 0.92 | 0.85 |
| 33:33:33 | 1.1 | 0.92 |

Figure 13:
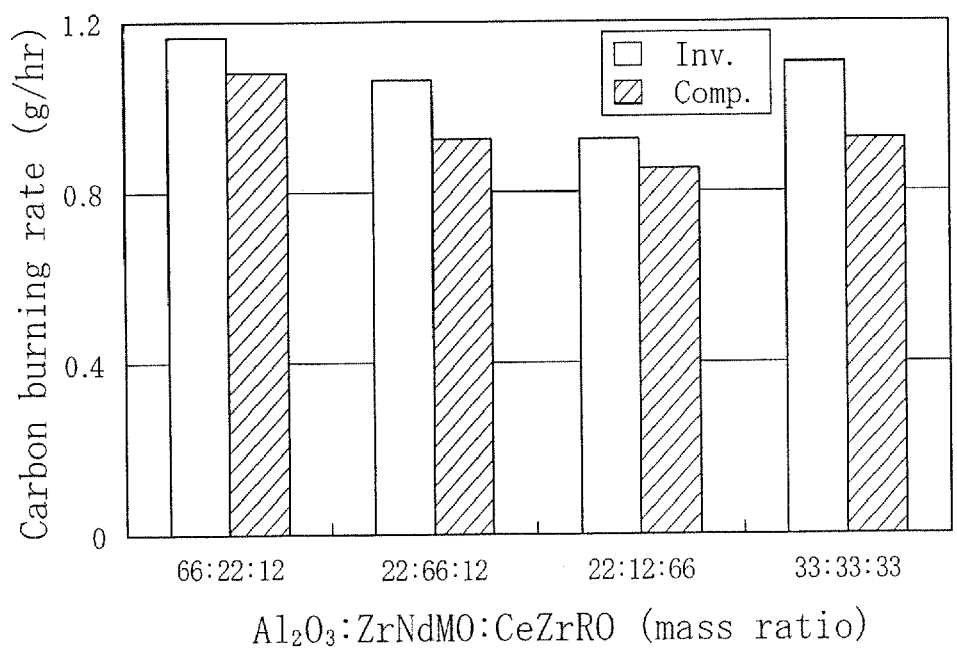
FIG. 13 is a graph showing the relation between carbon burning rate and the mass ratio among activated alumina, ZrNd-based mixed oxide and Ce-based mixed oxide in each of inventive examples according to Embodiment 2 and their comparative examples.

Reference to Table 10 and FIG. 13 shows that at all of the mixing ratios the inventive examples exhibited higher carbon burning rates than the comparative examples. Furthermore, for the inventive examples, the highest carbon burning rate was reached at a $Al_2O_3$:ZrNdMO:CeZrRO mass ratio of 66:22:12.

—Evaluation of Light-Off Performance for Exhaust Gas Conversion—

Each of the samples of the inventive examples and comparative examples was heat aged in the above-stated manner and then measured in terms of light-off temperature for conversion of HC and CO according to the above-stated light-off performance evaluation test, without deposition of carbon thereon. The light-off temperatures for HC conversion are shown in Table 11 and FIG. 14 and the light-off temperatures for CO conversion are shown in Table 11 and FIG. 15.

TABLE 11

| $Al_2O_3$:ZrNdMO: | Light-off temperature T50 (° C.) | | | |
|---|---|---|---|---|
| | HC conversion | | CO conversion | |
| CeZrRO (mass ratio) | Inventive Example | Comparative Example | Inventive Example | Comparative Example |
| 66:22:12 | 204 | 208 | 190 | 194 |
| 22:66:12 | 214 | 217 | 203 | 207 |
| 22:12:66 | 220 | 224 | 206 | 211 |
| 33:33:33 | 206 | 211 | 193 | 199 |

Figure 14:
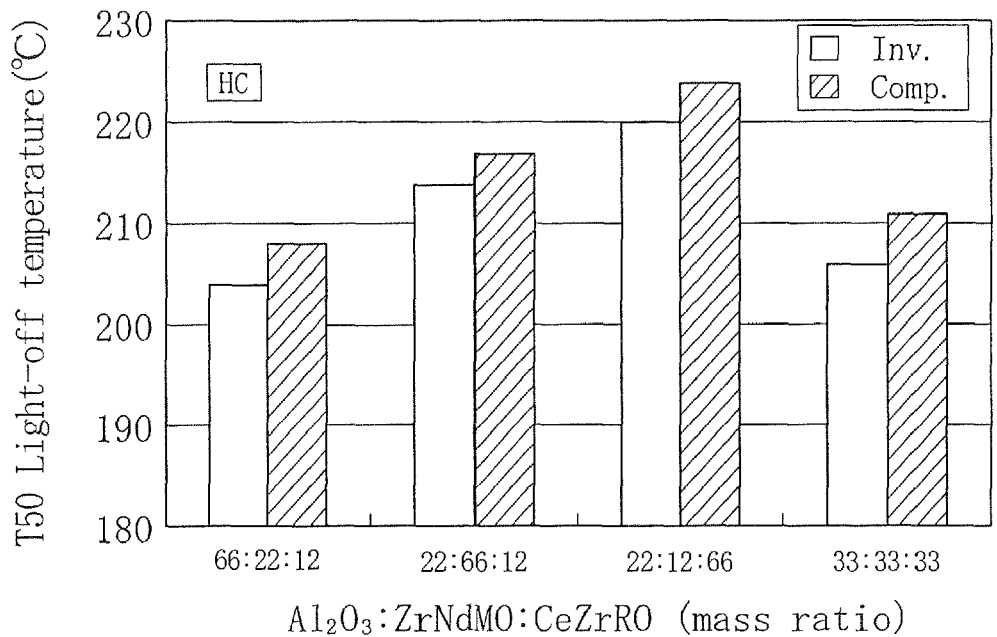
FIG. 14 is a graph showing the relation between light-off temperature for HC conversion and the mass ratio among activated alumina, ZrNd-based mixed oxide and Ce-based mixed oxide in each of the inventive examples according to Embodiment 2 and their comparative examples.
Figure 15:
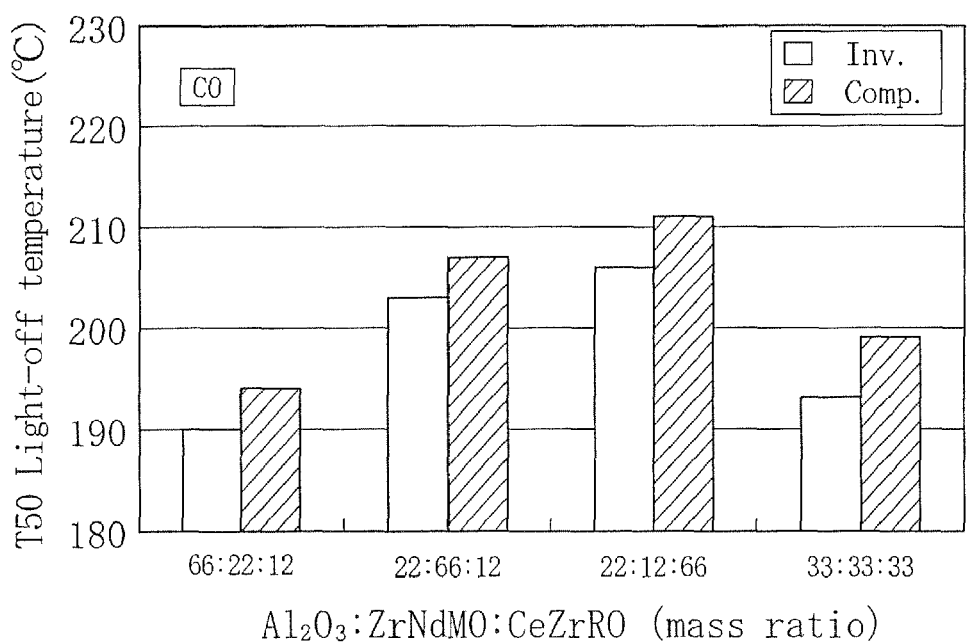
FIG. 15 is a graph showing the relation between light-off temperature for CO conversion and the mass ratio among activated alumina, ZrNd-based mixed oxide and Ce-based mixed oxide in each of the inventive examples according to Embodiment 2 and their comparative examples.

Reference to Table 11 and FIGS. 14 and 15 shows that at all of the mixing ratios the inventive examples exhibited lower light-off temperatures than the comparative examples. Furthermore, for the inventive examples, the lowest light-off temperature was reached at a $Al_2O_3$:ZrNdMO:CeZrRO mass ratio of 66:22:12.

Embodiment 3

Figure 16:
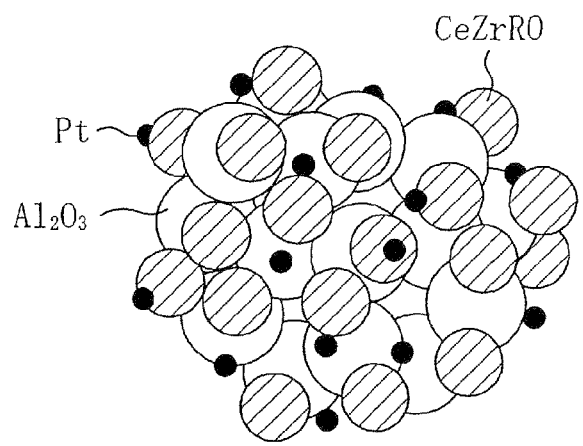
FIG. 16 is a schematic view showing a catalyst particle according to Embodiment 3.

A feature of this embodiment is that the catalyst layer 7 shown in FIG. 4 contains catalyst particles (a catalyst material) as schematically shown in FIG. 16. Specifically, the catalyst particle is formed so that primary particles of a CeZr-based mixed oxide containing Ce, Zr and a rare earth metal R other than Ce (hatched particles; CeZrRO) are dispersedly carried on the surface of a secondary particle formed by cohesion of primary particles of activated alumina (particles indicated by unfilled circles; $Al_2O_3$). Pt particles (indicated by filled circles) are carried as a catalytic metal on primary particles of the activated alumina ($Al_2O_3$) and primary particles of the CeZr-based mixed oxide (CeZrRO). The primary particles of activated alumina have a mean particle size of 1 to 100 nm (i.e., not smaller than 1 nm but not greater than 100 nm), the secondary particles of activated alumina have 200 to 500 nm and the primary particles of the CeZr-based mixed oxide have a mean particle size of 5 to 100 nm.

<Preparation of Catalyst Material>

The catalyst material can be prepared according to the following method.

—Preparation of Activated Alumina Secondary Particle—

Powdered activated alumina secondary particles can be prepared in the same manner as in Embodiment 1.

—Preparation of CeZr-Based Mixed Oxide Particle Precursor—

First prepared is a solution in which the powdered secondary particles are dispersed in an acid solution containing Ce ions, Zr ions and ions of at least one rare earth metal R of Nd and Pr. For this purpose, cerium nitrate (III) hexahydrate and Zirconium oxynitrate dihydrate can be used as source materials for Ce and Zr, respectively. Neodymium nitrate can be used as a source material for R, i.e., Nd and praseodymium nitrate can be used as a source material for Pr. Respective given amounts of the Ce source material, the Zr source material and the R source material are mixed with the powdered secondary particles and water.

Then, a basic solution is added to the above solution and mixed to deposit a precipitate of Ce—Zr—R mixed hydroxide, which is a precursor of CeZr-based mixed oxide primary particles, on the surfaces of the secondary particles. In this case, for example, the above mixed solution is stirred at room temperature for about one hour and aqueous ammonia at a concentration of about 7%, for example, is then mixed as the basic solution to the source solution. Instead of the aqueous ammonia, another basic solution, such as an aqueous solution of caustic soda, may be used.

—Other Steps for Preparation of Catalyst Material—

The other steps following the above steps, i.e., the rinsing and dehydration step, the drying and calcining step and the step of carrying a catalytic metal, are carried out in the same manner as in Embodiment 1.

Thus, a catalyst material composed of catalyst particles as shown in FIG. 16 is obtained.

<Preferred CeZr-Based Mixed Oxide Particle>

A preferred composition of the CeZr-based mixed oxide particle is basically the same as that in Embodiment 2 (see FIG. 11). Specifically, when the CeZr-based mixed oxide particles used Pr as the rare earth metal R, relatively high carbon burning rates were reached at small proportions of the rare earth metal oxide RO of 0.3% to 2% by mole. When the Ce-based mixed oxide particles used another rare earth metal, such as Nd, La or Y, relatively high carbon burning rates were reached at proportions of the rare earth metal oxide RO of 1% to 7% by mole or 1% to 6% by mole. Furthermore, among the four kinds of rare earth metals, the use of Nd or Pr is most advantageous in enhancing the carbon burning property, the $Nd_2O_3$ ratio is preferably 4% by mole and the $Pr_2O_3$ ratio is preferably 1.4% by mole.

<Preferred Composition of Catalyst Particle>

—Preparation of Samples—

According to the above-stated method for preparing a catalyst material, various kinds of catalyst materials of inventive examples were prepared that had different proportions of $CeO_2$ in CeZr-based mixed oxide particle ($CeO_2$/CeZrRO shown in % by mole and also referred to as "$CeO_2$ ratios") and different proportions of CeZr-based mixed oxide particles in the total amount of each activated alumina secondary particle (having a proportion of $La_2O_3$ of 5% by mass) and the CeZr-based mixed oxide particles (hereinafter referred to as "CeZrRO ratios"). Nd was used as the rare earth metal R for the CeZrR-based mixed oxide particle and the $Nd_2O_3$ ratio was fixed at 4% by mole. Furthermore, the catalytic metal Pt was carried on each support material by evaporation to dryness.

Furthermore, catalyst materials of comparative examples were obtained by preparing different kinds of CeZr-based mixed oxide secondary particles having different $CeO_2$ ratios and the same $Nd_2O_3$ ratio of 4% by mole by coprecipitation, physically mixing each of them with La-contained activated alumina secondary particles having a proportion of $La_2O_3$ of 5% by mass at an appropriate mixing ratio to obtain various kinds of powdered support materials and carrying Pt on each of them by evaporation to dryness. The secondary particles of the CeZr-based mixed oxide were prepared by obtaining a precursor of primary particles of the CeZr-based mixed oxide by coprecipitation, subjecting it to rinsing, drying and calcining under the same conditions as the case of dispersive carrying of primary particles of the CeZr-based mixed oxide on the surface of each activated alumina secondary particle, and then grinding it.

Then, according to the previously stated method for preparing a sample, samples (catalyst-supported particulate filters) were obtained by coating the catalyst materials of the inventive examples and comparative examples on their respective SiC-made filter supports having a volume of 25 mL, a cell wall thickness of 12 mil and 300 cpsi. The amount of each catalyst material carried per L of filter was 50 g/L, and the amount of Pt carried per L of filter was 1.0 g/L. Then, each sample was heat aged by keeping it at 800° C. for 24 hours in the atmospheric environment.

—Evaluation on Carbon Burning Property—

For each of the samples of the inventive examples and comparative examples, an amount of carbon (carbon black) corresponding to 10 g per L of filter was deposited on the walls of exhaust gas channels in the sample and the sample was then measured in terms of carbon burning rate at 590° C. according to the above-stated carbon burning property test. The measurement results on the inventive examples and the measurement results on the comparative examples are shown in Tables 12 and 13, respectively.

TABLE 12

Inventive Example; Carbon burning rate (g/hr, 590° C.)

| | | | $CeO_2$/CeZrRO ratio | | | | |
|---|---|---|---|---|---|---|---|
| | | | No. 1 10% by mole | No. 2 20% by mole | No. 3 45% by mole | No. 4 60% by mole | No. 5 80% by mole |
| CeZrRO/ (CeZrRO + $Al_2O_3$) ratio | a | 25% by mass | | 0.78 | 0.79 | 0.775 | |
| | b | 35% by mass | 0.74 | 0.8 | 0.815 | 0.79 | 0.74 |
| | c | 50% by mass | | 0.8 | 0.805 | 0.79 | |
| | d | 75% by mass | | 0.765 | 0.77 | 0.75 | |
| | e | 90% by mass | | 0.71 | 0.71 | 0.7 | |

Primary particles of mixed oxide CeZrRO are carried on each secondary particle of activated alumina.

TABLE 13

Comparative Example; Carbon burning rate (g/hr, 590° C.)

| | | | $CeO_2$/CeZrRO ratio | | | | |
|---|---|---|---|---|---|---|---|
| | | | No. 1 10% by mole | No. 2 20% by mole | No. 3 45% by mole | No. 4 60% by mole | No. 5 80% by mole |
| CeZrRO/ (CeZrRO + $Al_2O_3$) ratio | a | 25% by mass | | | 0.81 | | |
| | b | 35% by mass | 0.75 | 0.77 | 0.795 | 0.785 | 0.76 |
| | c | 50% by mass | | | 0.785 | | |
| | d | 75% by mass | | | 0.76 | | |
| | e | 90% by mass | | | 0.7 | | |

Activated alumina secondary particles and mixed oxide CeZrRO secondary particles are mixed.

Comparison of the inventive examples (Table 12) with their comparative examples (Table 13) shows that when the $CeO_2$ ratio was 20%, 45% and 60% by mole, the inventive examples exhibited higher carbon burning rates than the comparative examples, except for when the $CeO_2$ ratio was 45% by mole and the CeZrRO ratio was 25% by mass. Particularly, Inventive Example 3b (having a $CeO_2$ ratio of 45% by mole and a CeZrRO ratio of 35% by mass) exhibited a high carbon burning rate.

The reason for these results can be considered to be that since in the inventive examples each kind of CeZr-based mixed oxide was dispersedly carried in the form of primary particles of small particle size on the surface of each secondary particle of activated alumina, the amount of oxygen storage/release of the CeZr-based mixed oxide increased and the CeZr-based mixed oxide primary particles were less likely to cause a cohesion due to heat, i.e., the heat resistance of the catalyst material increased.

Figure 17:
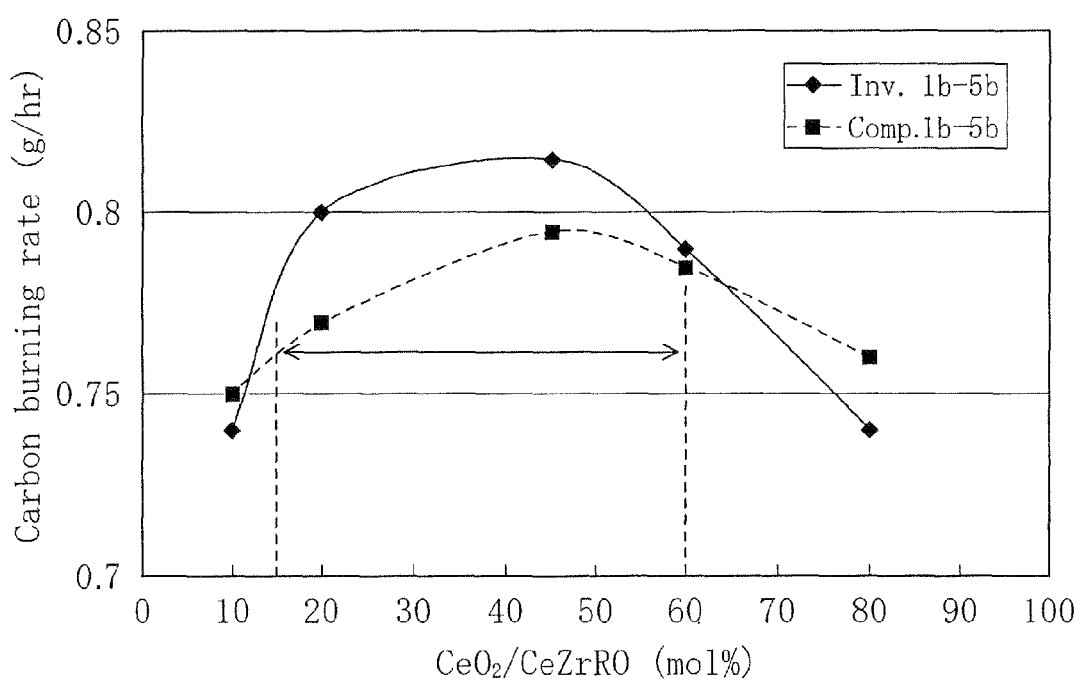
FIG. 17 is a graph showing the relation between carbon burning rate and the $CeO_2$ ratio of each of CeZr-based mixed oxides of inventive examples according to Embodiment 3 and their comparative examples.

In this context, graphically shown in FIG. 17 are the carbon burning rates of Inventive Examples 1b, 2b, 3b, 4b and 5b and Comparative Examples 1b, 2b, 3b, 4b and 5b having a fixed CeZrRO ratio of 35% by mass and different $CeO_2$ ratios. Furthermore, graphically shown in FIG. 18 are the carbon burning rates of Inventive Examples 3a to 3e and Comparative Examples 3a to 3e having a fixed $CeO_2$ ratio of 45% by mole and different CeZrRO ratios.

Reference to FIG. 17 shows that when the $CeO_2$ ratio was 15% to 60% by mole, both inclusive, the inventive examples exhibited higher carbon burning rates than their comparative examples and that even when the $CeO_2$ ratio was 15% by mole, the inventive example can be expected to have a higher carbon burning rate than its comparative example. Therefore, it can be said that the $CeO_2$ ratio is preferably 15% to 60% by mole, both inclusive. The $CeO_2$ ratio is more preferably 20% to 55% by mole, both inclusive, and still more preferably 20% to 45% by mole, both inclusive.

Figure 18:
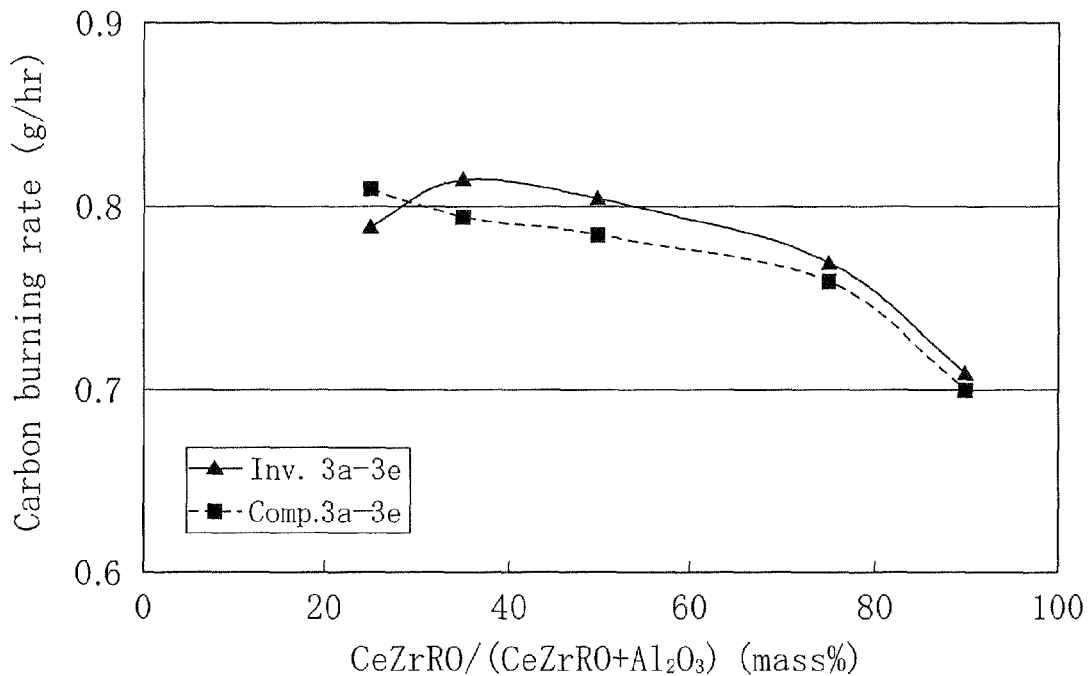
FIG. 18 is a graph showing the relation between carbon burning rate and the CeZrRO ratio of each of inventive examples according to Embodiment 3 and their comparative examples.

Reference to FIG. 18 shows that when the CeZrRO ratio was 35% to 90% by mass, both inclusive, the inventive examples had higher carbon burning rates than their comparative examples and that even when the CeZrRO ratio was 30% by mass, the inventive example can be expected to have a higher carbon burning rate than its comparative example. Therefore, it can be said that the CeZrRO ratio is preferably 30% to 90% by mass, both inclusive. The CeZrRO ratio is more preferably 35% to 75% by mass, both inclusive, and still more preferably 35% to 50% by mass, both inclusive.

—Evaluation of Light-Off Performance for Exhaust Gas Conversion—

Each of the samples of the inventive examples and comparative examples was measured in terms of light-off performance for conversion of HC and CO in exhaust gas in the same manner as the light-off performance test in Embodiment 1 without deposition of carbon black. The measurement results on the inventive examples and the measurement results on the comparative examples are shown in Tables 14 and 15, respectively.

TABLE 14

Inventive Example; Light-off temperature T50 (° C.)

| | | | $CeO_2$/CeZrRO ratio | | | | | | | | |
|---|---|---|---|---|---|---|---|---|---|---|---|
| | | | No. 1 10% by mole | | No. 2 20% by mole | | No. 3 45% by mole | | No. 4 60% by mole | | No. 5 80% by mole | |
| | | | HC | CO | HC | CO | HC | CO | HC | CO | HC | CO |
| CeZrRO/ (CeZrRO + $Al_2O_3$) ratio | a | 25% by mass | | | 209 | 193 | 208 | 190 | 215 | 202 | | |
| | b | 35% by mass | 226 | 208 | 209 | 193 | 208 | 190 | 216 | 201 | 232 | 217 |
| | c | 50% by mass | | | 211 | 194 | 209 | 191 | 216 | 200 | | |
| | d | 75% by mass | | | 216 | 199 | 214 | 198 | 221 | 204 | | |
| | e | 90% by mass | | | 223 | 208 | 223 | 208 | 227 | 211 | | |

Primary particles of mixed oxide CeZrRO are carried on each secondary particle of activated alumina.

TABLE 15

Comparative Example; Light-off temperature T50 (° C.)

| | | | $CeO_2$/CeZrRO ratio | | | | | | | | |
|---|---|---|---|---|---|---|---|---|---|---|---|
| | | | No. 1 10% by mole | | No. 2 20% by mole | | No. 3 45% by mole | | No. 4 60% by mole | | No. 5 80% by mole | |
| | | | HC | CO | HC | CO | HC | CO | HC | CO | HC | CO |
| CeZrRO/ (CeZrRO + $Al_2O_3$) ratio | a | 25% by mass | | | | | 210 | 193 | | | | |
| | b | 35% by mass | 222 | 206 | 215 | 200 | 212 | 195 | 216 | 201 | 230 | 211 |
| | c | 50% by mass | | | | | 214 | 197 | | | | |
| | d | 75% by mass | | | | | 219 | 203 | | | | |
| | e | 90% by mass | | | | | 230 | 215 | | | | |

Activated alumina secondary particles and mixed oxide CeZrRO secondary particles are mixed.

Reference to Tables 14 and 15 shows that when the $CeO_2$ ratio was 45% by mole, the inventive examples exhibited lower light-off temperatures at all of the CeZrRO ratios than their comparative examples. Furthermore, when the CeZrRO ratio was 35% by mass, the inventive examples generally exhibited lower light-off temperatures than their comparative examples, except for when the $CeO_2$ ratio was small and large. The reason for these results can also be considered to be that the inventive examples increased the amount of oxygen storage/release and the heat resistance as compared to the comparative examples.

Figure 19:
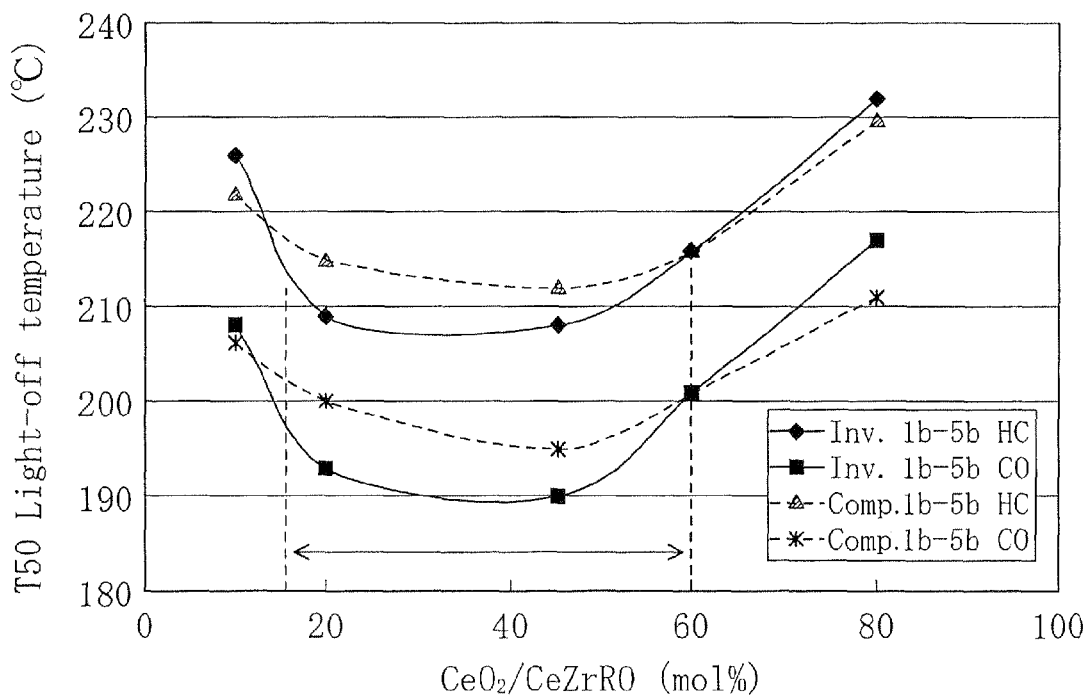
FIG. 19 is a graph showing the relation between light-off temperature and the $CeO_2$ ratio of each of CeZr-based mixed oxides of inventive examples according to Embodiment 3 and their comparative examples.

In this context, graphically shown in FIG. 19 are the light-off temperatures of Inventive Examples 1b, 2b, 3b, 4b and 5b and Comparative Examples 1b, 2b, 3b, 4b and 5b having a fixed CeZrRO ratio of 35% by mass and different $CeO_2$ ratios. Furthermore, graphically shown in FIG. 20 are the light-off temperatures of Inventive Examples 3a to 3e and Comparative Examples 3a to 3e having a fixed $CeO_2$ ratio of 45% by mole and different CeZrRO ratios.

Reference to FIG. 19 shows that when the $CeO_2$ ratio was 15% to 60% by mole, both inclusive, one of the inventive examples and its comparative example had the same light-off temperature for both of HC and CO conversion and the other inventive examples had lower light-off temperatures than their comparative examples and that particularly when the $CeO_2$ ratio was 20% to 45% by mole, both inclusive, the inventive examples exhibited low light-off temperatures.

Figure 20:
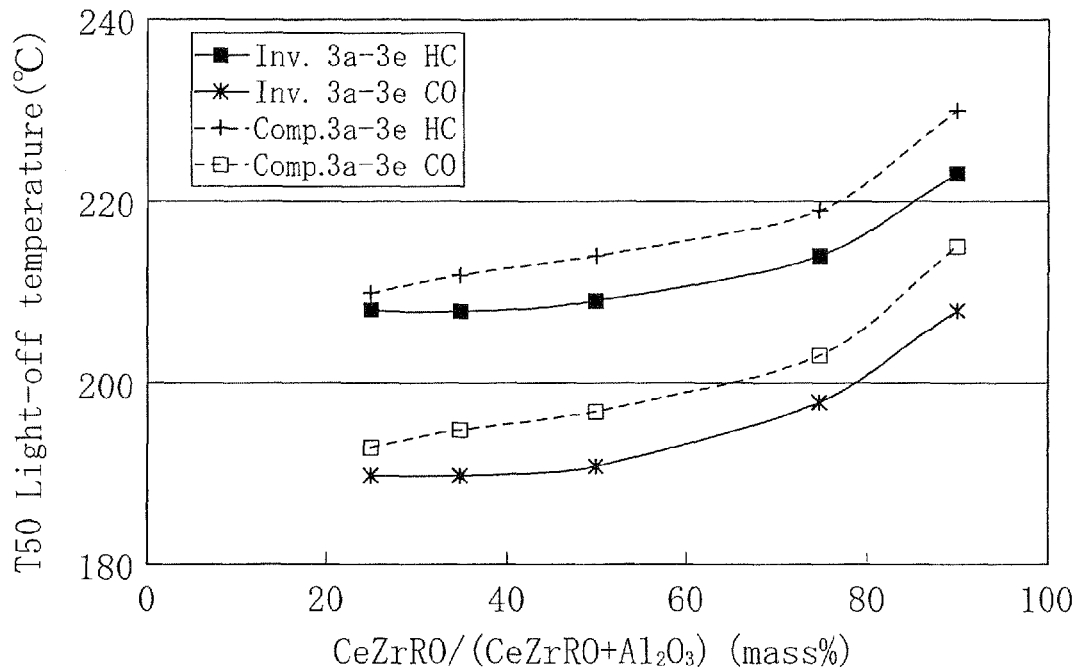
FIG. 20 is a graph showing the relation between light-off temperature and the CeZrRO ratio of each of inventive examples according to Embodiment 3 and their comparative examples.

Reference to FIG. 20 shows that when the CeZrRO ratio was 25% to 90% by mass, both inclusive, the inventive examples had lower light-off temperatures than their comparative examples and that even when the CeZrRO ratio was 20% by mass, the inventive example can be expected to a lower light-off temperature than its comparative example. Furthermore, FIG. 20 shows that particularly when the CeZrRO ratio was 25% to 75% by mass, both inclusive, the inventive examples exhibited low light-off temperatures and, therefore, had high catalytic activity at low temperatures.

Embodiment 4

This embodiment is characterized in that each secondary particle on which CeZr-based mixed oxide particles are carried is composed of primary particles of activated alumina and primary particles of a ZrNd-based mixed oxide. The other structural features of the catalyst particle are the same as in Embodiment 3. In this case, primary particles of activated alumina and primary particles of the ZrNd-based mixed oxide having oxygen ion conductivity are mixed and cohere together to form a secondary particle. A catalytic metal is carried not only on primary particles of the CeZr-based mixed oxide and primary particles of the activated alumina but also on primary particles of the ZrNd-based mixed oxide. The primary particles of the ZrNd-based mixed oxide have a mean particle size of 5 to 50 nm.

<Preparation of Catalyst Material>

The catalyst material can be prepared according to the following method.

—Preparation of Activated Alumina Particle Precursor—

A precursor of activated alumina particles can be prepared in the same manner as in Embodiment 1.

—Preparation of ZrNd-Based Mixed Oxide Particle Precursor—

First, a source solution containing Zr ions, Nd ions and ions of a rare earth metal M other than Ce and Nd is prepared. Then, a basic solution is added to the source solution and mixed to produce precipitated particles of a Zr—Nd-M mixed hydroxide that is a precursor of ZrNd-based mixed oxide primary particles. In this case, for example, the source solution is stirred at room temperature for about one hour and aqueous ammonia at a concentration of about 7%, for example, is then mixed as the basic solution to the source solution. Instead of the aqueous ammonia, another basic solution, such as an aqueous solution of caustic soda, may be used.

—Formation of Powdered Secondary Particles—

Powdered secondary particles each made of the activated alumina particle precursor and the ZrNd-based mixed oxide particle precursor obtained in the above steps (powdered secondary particles in each of which activated alumina primary particles and ZrNd-based mixed oxide primary particles are mixed and cohere together) can be formed in the same manner as the formation of powdered secondary particles each made of the activated alumina particle precursor and the CeZr-based mixed oxide particle precursor in Embodiment 2.

—Other Steps for Preparation of Catalyst Material—

The other steps following the above steps, i.e., the preparation of a CeZr-based mixed oxide particle precursor, the rinsing and dehydration step, the drying and calcining step and the step of carrying a catalytic metal, are carried out in the same manner as in Embodiment 3.

<Preferred ZrNd-Based Mixed Oxide Particle>

A preferred composition of the ZrNd-based mixed oxide particle is basically the same as that in Embodiment 1 (see Table 1 and FIG. 6). Therefore, it is preferable that the ZrNd-based mixed oxide particle uses La, Pr or Y as the rare earth metal M. In the cases where the proportion of rare earth metal M oxide is low, the use of La as the rare earth metal M is advantageous in increasing the carbon burning rate. On the other hand, in the cases where the proportion of rare earth metal M oxide is high, the use of Pr as the rare earth metal M is advantageous in increasing the carbon burning rate. Furthermore, the proportion of the total amount of neodymium oxide and M oxide is preferably more than 20% by mole in enhancing the particulate burning property. Particularly, it is preferable to attain a proportion of the above total amount of over 20% by mole while raising the proportion of neodymium oxide or praseodymium oxide. On the other hand, the proportion of the above total amount is preferably less than 45% by mole and more preferably less than 40% by mole in order to restrain the amount of CO produced from increasing owing to imperfect combustion of carbon. Furthermore, as can be seen from FIG. 6, when the ZrNd-based mixed oxide uses Pr as the rare earth metal M, the proportion of $Pr_2O_3$ is preferably 6% by mole or higher in order to increase the carbon burning rate. On the other hand, when the ZrNd-based mixed oxide uses La as the rare earth metal M, the proportion of $La_2O_3$ is preferably 20% by mole or lower.

<$CeO_2$ Ratio of CeZr-Based Mixed Oxide and $ZrO_2$ Ratio of Zr-Based Mixed Oxide>

—Preparation of Samples—

According to the above method for preparing a catalyst material, a plurality of kinds of catalyst materials of inventive examples were prepared that had a fixed $Al_2O_3$:ZrNdMO:CeZrRO mass ratio among activated alumina, Nd-contained Zr-based mixed oxide and CeZr-based mixed oxide of 66:22:12, different proportions of $CeO_2$ in CeZr-based mixed oxide (also referred to as "$CeO_2$ ratios") and different proportions of $ZrO_2$ in Zr-based mixed oxide (hereinafter referred to as "$ZrO_2$ ratios"). The catalyst materials of the inventive examples are materials in each of which Pt is supported on a powdered support material. The support material is a material in which primary particles of a CeZr-based mixed oxide are dispersedly carried on the surface of each secondary particle.

The secondary particle is formed so that activated alumina particles and Zr-based mixed oxide particles are mixed and cohere together.

Then, samples (catalyst-supported particulate filters) of inventive examples were obtained by coating the catalyst materials of the inventive examples on their respective SiC-made filter supports (filter bodies) having a volume of 25 mL, a cell wall thickness of 12 mil and 300 cpsi. In each of the samples of the inventive examples, the amount of catalyst material carried per L of filter was 50 g/L, the amount of Pt carried per L of filter was 1.0 g/L, activated alumina was contained La to attain a proportion of $La_2O_3$ of 5% by mass, the CeZr-based mixed oxide contained Nd as the rare earth metal R to attain a proportion of $Nd_2O_3$ of 4% by mole and the Nd-contained Zr-based mixed oxide contained Pr as the rare earth metal M to attain a proportion of $Pr_2O_3$ of 12% by mole.

—Evaluation on Carbon Burning Property—

Then, each of the samples of the inventive examples was heat aged in the above-stated manner, carbon was deposited on the walls of exhaust gas channels in the sample in the above-stated manner and the sample was then measured in terms of carbon burning rate at 590° C. according to the above-stated carbon burning property test. The measurement results on the inventive examples are shown in Table 16.

TABLE 16

Inventive Example; Carbon burning rate (g/hr, 590° C.)

| | | | $ZrO_2$/ZrNdMO ratio | | | |
|---|---|---|---|---|---|---|
| | | | No. 1 55% by mole | No. 2 75% by mole | No. 3 80% by mole | No. 4 90% by mole |
| $CeO_2$/ CeZrRO ratio | a | 10% by mole | 1.01 | 0.97 | 0.85 | |
| | b | 20% by mole | 1.17 | 1.1 | 0.89 | 0.81 |
| | c | 45% by mole | 1.13 | 1.11 | 0.91 | 0.81 |
| | d | 60% by mole | 0.96 | 0.93 | | |
| | e | 80% by mole | 0.88 | 0.86 | | |

Primary particles of mixed oxide CeZrRO are carried on each secondary particle composed of activated alumina primary particles and mixed oxide ZrNdMO primary particles.

Since the inventive examples of Embodiment 4 have a $Al_2O_3$:ZrNdMO:CeZrRO mass ratio of 66:22:12, their CeZrRO/($Al_2O_3$+CeZrRO) mass ratio is 15% by mass. On the other hand, the lowest CeZrRO ratio in all of the inventive examples of Embodiment 3 shown in Table 12 is 25% by mass. Therefore, although easy comparison cannot be made between the inventive examples of Embodiment 3 and the inventive examples of Embodiment 4, reference to the inventive examples of Embodiment 3 shows that when the CeZrRO ratio became lower than 35% by mass at which the carbon burning rate reached peaks, the carbon burning rate tended to drop and that even when the CeZrRO ratio was 35% by mass, the maximum carbon burning rate was 0.815 g/hr in Inventive Example 3b. On the other hand, reference to the inventive examples of Embodiment 4 (Table 16) shows that in all of the inventive examples but those at a $ZrO_2$ ratio of 90% by mole their carbon burning rates were higher than those of the inventive examples of Embodiment 3. These results are due to the oxygen ion conductivity of ZrNd-based mixed oxide primary particles contained in each secondary particle of Embodiment 4.

Furthermore, comparison of the inventive examples (Table 16) of Embodiment 4 with the comparative examples (Table 7) of Embodiment 2 shows that when the $CeO_2$ ratio of the CeZr-based mixed oxide was 20% to 45% by mole, both inclusive, and the $ZrO_2$ ratio of the ZrNd-based mixed oxide was 55% to 75% by mole, both inclusive, the inventive examples exhibited better results than the comparative examples. It can be said from the above that the effectiveness of the combination of CeZr-based mixed oxide primary particles and a secondary particle of a mixture of activated alumina particles and ZrNd-based mixed oxide particles in enhancing the carbon burning rate is a specific phenomenon within the above range of $CeO_2$ ratios and the above range of $ZrO_2$ ratios.

—Evaluation of Light-Off Performance for Exhaust Gas Conversion—

Each of the samples of the inventive examples was heat aged in the above-stated manner and then measured in terms of light-off temperature for conversion of HC and CO according to the above-stated light-off performance evaluation test, without deposition of carbon thereon. The measurement results on the inventive examples are shown in Table 17.

TABLE 17

Inventive Example; Light-off temperature T50 (° C.)

| | | | $ZrO_2$/ZrNdMO ratio | | | | | | | |
|---|---|---|---|---|---|---|---|---|---|---|
| | | | No. 1 55% by mole | | No. 2 75% by mole | | No. 3 80% by mole | | No. 4 90% by mole | |
| | | | HC | CO | HC | CO | HC | CO | HC | CO |
| $CeO_2$/ CeZrRO ratio | a | 10% by mole | 213 | 199 | 216 | 206 | | | | |
| | b | 20% by mole | 205 | 192 | 209 | 195 | 220 | 207 | 222 | 210 |
| | c | 45% by mole | 204 | 191 | 208 | 193 | 218 | 205 | 221 | 209 |
| | d | 60% by mole | 212 | 200 | 217 | 203 | | | | |
| | e | 80% by mole | 218 | 204 | 222 | 209 | | | | |

Primary particles of mixed oxide CeZrRO are carried on each secondary particle composed of activated alumina primary particles and mixed oxide ZrNdMO primary particles.

Comparison of the inventive examples (Table 17) of Embodiment 4 with the inventive examples (Table 14) of Embodiment 3 shows that there was no significant difference in light-off performance for exhaust gas conversion between those of Embodiment 4 and those of Embodiment 3. In contrast, comparison of the inventive examples (Table 17) of Embodiment 4 with the comparative examples (Table 9) of Embodiment 2 shows that when the $CeO_2$ ratio of the CeZr-based mixed oxide was 20% to 45% by mole, both inclusive, and the $ZrO_2$ ratio of the ZrNd-based mixed oxide was 55% to 75% by mole, both inclusive, the inventive examples exhibited better results than the comparative examples. It can be said from the above that the effectiveness of the combination of CeZr-based mixed oxide primary particles and a secondary particle of a mixture of activated alumina particles and ZrNd-based mixed oxide particles in enhancing the light-off performance is a specific phenomenon within the above range of $CeO_2$ ratios and the above range of $ZrO_2$ ratios.

As can be seen from the above, when a secondary particle is formed by activated alumina primary particles and Zr-based mixed oxide primary particle, it is preferable that the $CeO_2$ ratio of the CeZr-based mixed oxide is 20% to 45% by mole, both inclusive, and the $ZrO_2$ ratio of the ZrNd-based mixed oxide is 55% to 75% by mole, both inclusive.

<Ratio Among Activated Alumina, CeZr-Based Mixed Oxide and ZrNd-Based Mixed Oxide>

—Preparation of Samples—

According to the above method for preparing a catalyst material, four kinds of catalyst materials of inventive examples were prepared that had different $Al_2O_3$:ZrNdMO:CeZrRO mass ratios among activated alumina and ZrNd-based mixed oxide and CeZr-based mixed oxide. The catalyst materials of the inventive examples are materials in each of which Pt is supported on a powdered support material. The support material is a material in which primary particles of a CeZr-based mixed oxide are dispersedly carried on the surface of each secondary particle. The secondary particle is formed so that activated alumina particles and ZrNd-based mixed oxide particles are mixed and cohere together. The compositions of the four kinds of inventive examples are shown in the triangular chart of FIG. 12.

Then, samples (catalyst-supported particulate filters) of inventive examples were obtained by coating the catalyst materials of the inventive examples on their respective SiC-made filter supports (filter bodies) having a volume of 25 mL, a cell wall thickness of 12 mil and 300 cpsi. In each of the samples of the inventive examples, the amount of catalyst material carried per L of filter was 50 g/L, the amount of Pt carried per L of filter was 1.0 g/L, activated alumina was contained La to attain a proportion of $La_2O_3$ of 5% by mass, the CeZr-based mixed oxide was prepared to have a $CeO_2$:$ZrO_2$:$Nd_2O_3$ mole ratio of 20:76:4 and the ZrNd-based mixed oxide was prepared to have a $ZrO_2$:$Nd_2O_3$:$Pr_2O_3$ mole ratio of 55:33:12.

—Evaluation on Carbon Burning Property—

Then, each of the samples of the inventive examples was heat aged in the above-stated manner, carbon was deposited on the walls of exhaust gas channels in the sample in the above-stated manner and the sample was then measured in terms of carbon burning rate at 590° C. according to the above-stated carbon burning property test. The measurement results are shown in Table 18 and FIG. 21. Note that the comparative examples in Table 18 and FIG. 21 are the comparative examples of Embodiment 2.

TABLE 18

| $Al_2O_3$:ZrNdMO:CeZrRO (mass ratio) | Carbon burning rate (g/hr) | |
|---|---|---|
| | Inventive Example | Comparative Example |
| 66:22:12 | 1.17 | 1.08 |
| 22:66:12 | 1.03 | 0.92 |
| 22:12:66 | 0.93 | 0.85 |
| 33:33:33 | 1.12 | 0.92 |

Figure 21:
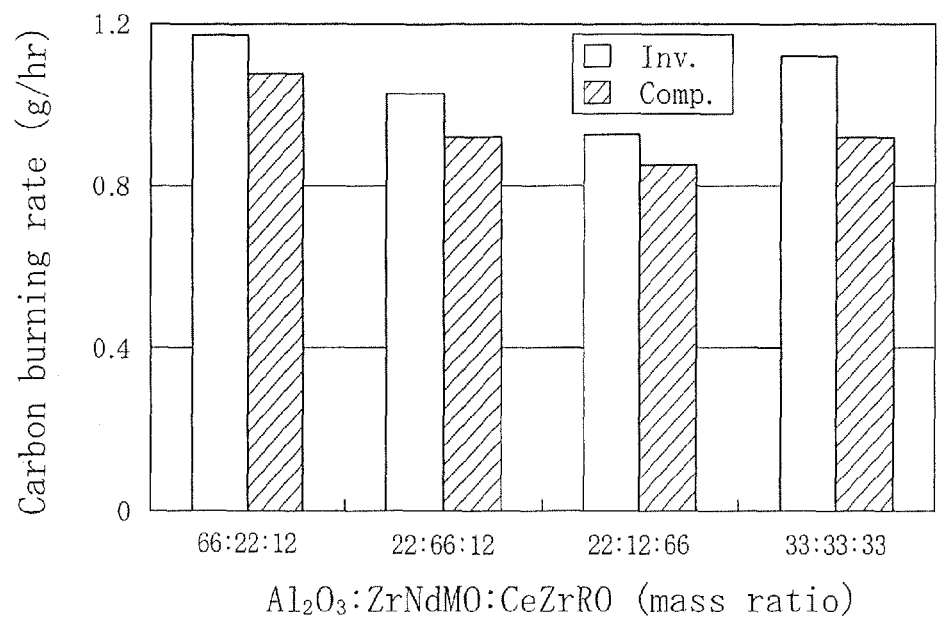
FIG. 21 is a graph showing the relation between carbon burning rate and the mass ratio among activated alumina, Zr-based mixed oxide and Ce-based mixed oxide in each of inventive examples according to Embodiment 4 and their comparative examples.

Reference to Table 18 and FIG. 21 shows that at all of the mixing ratios the inventive examples exhibited higher carbon burning rates than the comparative examples. Furthermore, for the inventive examples, the highest carbon burning rate was reached at a $Al_2O_3$:ZrNdMO:CeZrRO mass ratio of 66:22:12.

—Evaluation of Light-Off Performance for Exhaust Gas Conversion—

Each of the samples of the inventive examples was heat aged in the above-stated manner and then measured in terms of light-off temperature for conversion of HC and CO according to the above-stated light-off performance evaluation test, without deposition of carbon thereon. The light-off temperatures for HC conversion are shown in Table 19 and FIG. 22 and the light-off temperatures for CO conversion are shown in Table 19 and FIG. 23. Note that the comparative examples in Table 19 and FIGS. 22 and 23 are the comparative examples of Embodiment 2.

TABLE 19

| $Al_2O_3$:ZrNdMO:CeZrRO (mass ratio) | Light-off temperature T50 (° C.) | | | |
|---|---|---|---|---|
| | HC conversion | | CO conversion | |
| | Inventive Example | Comparative Example | Inventive Example | Comparative Example |
| 66:22:12 | 203 | 208 | 189 | 194 |
| 22:66:12 | 214 | 217 | 204 | 207 |
| 22:12:66 | 214 | 224 | 203 | 211 |
| 33:33:33 | 206 | 211 | 194 | 199 |

Figure 22:
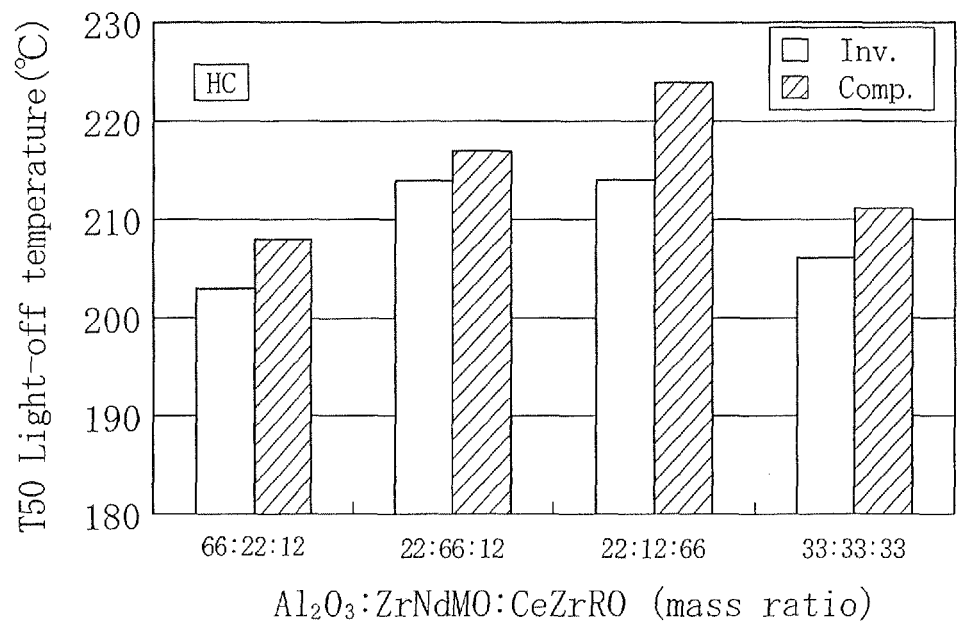
FIG. 22 is a graph showing the relation between light-off temperature for HC conversion and the mass ratio among activated alumina, Zr-based mixed oxide and Ce-based mixed oxide in each of the inventive examples according to Embodiment 4 and their comparative examples.
Figure 23:
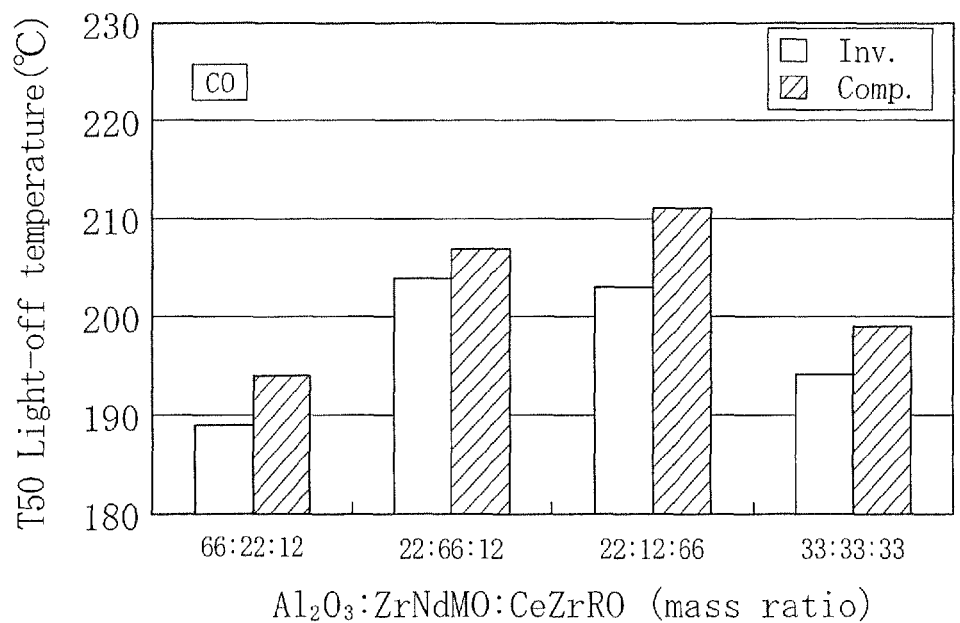
FIG. 23 is a graph showing the relation between light-off temperature for CO conversion and the mass ratio among activated alumina, Zr-based mixed oxide and Ce-based mixed oxide in each of the inventive examples according to Embodiment 4 and the comparative examples.

Reference to Table 19 and FIGS. 22 and 23 shows that at all of the mixing ratios the inventive examples exhibited lower light-off temperatures than the comparative examples. Furthermore, for the inventive examples, the lowest light-off temperature was reached at a $Al_2O_3$:ZrNdMO:CeZrRO mass ratio of 66:22:12.

Embodiment 5

Figure 24:
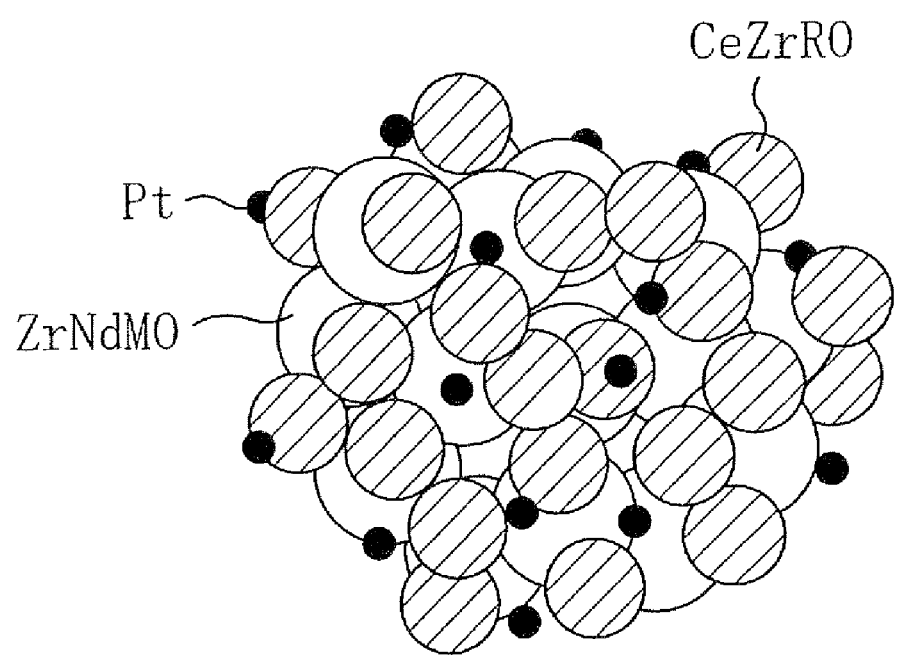
FIG. 24 is a schematic view showing a catalyst particle according to Embodiment 5.

A feature of this embodiment is that the catalyst layer 7 shown in FIG. 4 contains catalyst particles (a catalyst material) as schematically shown in FIG. 24. Specifically, the catalyst particle is formed so that primary particles of a CeZr-based mixed oxide (hatched particles; CeZrRO) are dispersedly carried on the surface of a secondary particle formed by cohesion of primary particles of a ZrNd-based mixed oxide (particles indicated by unfilled circles; ZrNdMO). Furthermore, Pt particles (indicated by filled circles) are carried as a catalytic metal on primary particles of the ZrNd-based mixed oxide (ZrNdMO) and primary particles of the CeZr-based mixed oxide (CeZrRO). The primary particles of the ZrNd-based mixed oxide have a mean particle size of 5 to 50 nm (not smaller than 1 nm but not greater than 100 nm), the secondary particles of the ZrNd-based mixed oxide have 200 to 500 nm and the primary particles of the CeZr-based mixed oxide have a mean particle size of 5 to 100 nm.

<Preparation of Catalyst Material>

The catalyst material can be prepared according to the following method.

—Preparation of ZrNd-Based Mixed Oxide Particle Precursor—

A precursor of the ZrNd-based mixed oxide particles can be prepared in the same manner as in Embodiment 4.

—Preparation of Powdered ZrNd-Based Mixed Oxide Secondary Particles—

Like the preparation of powdered activated alumina secondary particles in Embodiment 1, a precipitate of the precursor of ZrNd-based mixed oxide particles is subjected to the rinsing and dehydration step and the drying and calcining step to obtain powdered secondary particles each formed by cohesion of primary particles of the ZrNd-based mixed oxide.

—Other Steps for Preparation of Catalyst Material—

The other steps following the above steps, i.e., the preparation of a CeZr-based mixed oxide particle precursor, the rinsing and dehydration step, the drying and calcining step and the step of carrying a catalytic metal, are carried out in the same manner as in Embodiment 3.

<Preferred ZrNd-Based Mixed Oxide Particle>

A preferred composition of the ZrNd-based mixed oxide particle is the same as that in Embodiment 4 (see Table 1 and FIG. 6).

<Preferred CeZr-Based Mixed Oxide Particle>

A preferred composition of the CeZr-based mixed oxide particle is the same as that in Embodiment 3 (see FIG. 11).

<Preferred Composition of Catalyst Particle>

—Preparation of Samples—

According to the above-stated method for preparing a catalyst material, various kinds of catalyst materials of inventive examples were prepared that had different proportions of a ZrNd-based mixed oxide in the total amount of the ZrNd-based mixed oxide and a CeZr-based mixed oxide (ZrNdMO/(CeZrRO+ZrNdMO) shown in % by mass and hereinafter referred to as "ZrNdMO ratios").

Furthermore, various kinds of catalyst materials of comparative examples were obtained by preparing secondary particles of a ZrNd-based mixed oxide and secondary particles of a CeZr-based mixed oxide by coprecipitation, physically mixing the two kinds of secondary particles at various mixing ratios to obtain various kinds of support materials and carrying Pt on each of them by evaporation to dryness. The secondary particles of the CeZr-based mixed oxide were prepared by obtaining a precursor of the CeZr-based mixed oxide by coprecipitation and subjecting it to rinsing, drying and calcining under the same conditions as the case of preparation of secondary particles of the ZrNd-based mixed oxide.

In each of the inventive and comparative examples, the ZrNd-based mixed oxide had a $ZrO_2:Nd_2O_3:Pr_2O_3$ mole ratio of 76:12:12 and the CeZr-based mixed oxide had a $CeO_2:ZrO_2:Nd_2O_3$ mole ratio of 24:72:4.

Then, according to the previously stated method for preparing a sample, samples (catalyst-supported particulate filters) were obtained by coating the catalyst materials of the inventive examples and comparative examples on their respective SiC-made filter supports having a volume of 25 mL, a cell wall thickness of 12 mil and 300 cpsi. The amount of each catalyst material carried per L of filter was 50 g/L, and the amount of Pt carried per L of filter was 1.0 g/L. Then, each sample was heat aged by keeping it at 800° C. for 24 hours in the atmospheric environment.

—Evaluation on Carbon Burning Property—

For each of the samples of the inventive examples and comparative examples, an amount of carbon (carbon black) corresponding to 10 g per L of filter was deposited on the walls of exhaust gas channels in the sample and the sample was then measured in terms of carbon burning rate at 590° C. according to the above-stated carbon burning property test. The measurement results are shown in FIG. 25.

Figure 25:
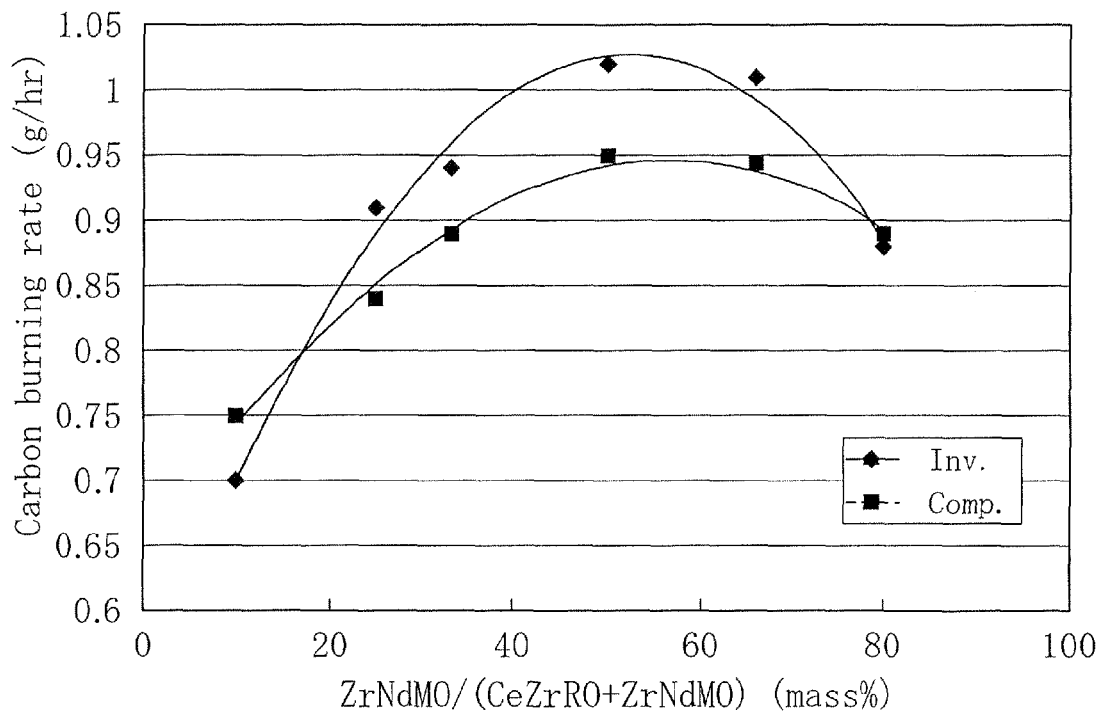
FIG. 25 is a graph showing the relation between carbon burning rate and the ZrNdMO ratio of each of inventive examples according to Embodiment 5 and their comparative examples.

Reference to FIG. 25 shows that when the ZrNdMO ratio was 25% to 67% by mass, both inclusive, the inventive examples exhibited higher carbon burning rates than the comparative examples. Even when the ZrNdMO ratio was 20% and 75% by mass, the inventive examples can be expected to have higher carbon burning rates than their comparative examples. The reason for these results can be considered to be that since in the inventive examples the CeZr-based mixed oxide was dispersedly carried in the form of small primary particles on the surface of each secondary particle of the ZrNd-based mixed oxide, the oxygen storage/release efficiency of the CeZr-based mixed oxide increased and the heat resistance increased.

—Evaluation of Light-Off Performance for Exhaust Gas Conversion—

Furthermore, each of the samples of the inventive examples and comparative examples was measured in terms of light-off temperature for conversion of HC and CO according to the above-stated light-off performance evaluation test. The measurement results are shown in FIG. 26.

Figure 26:
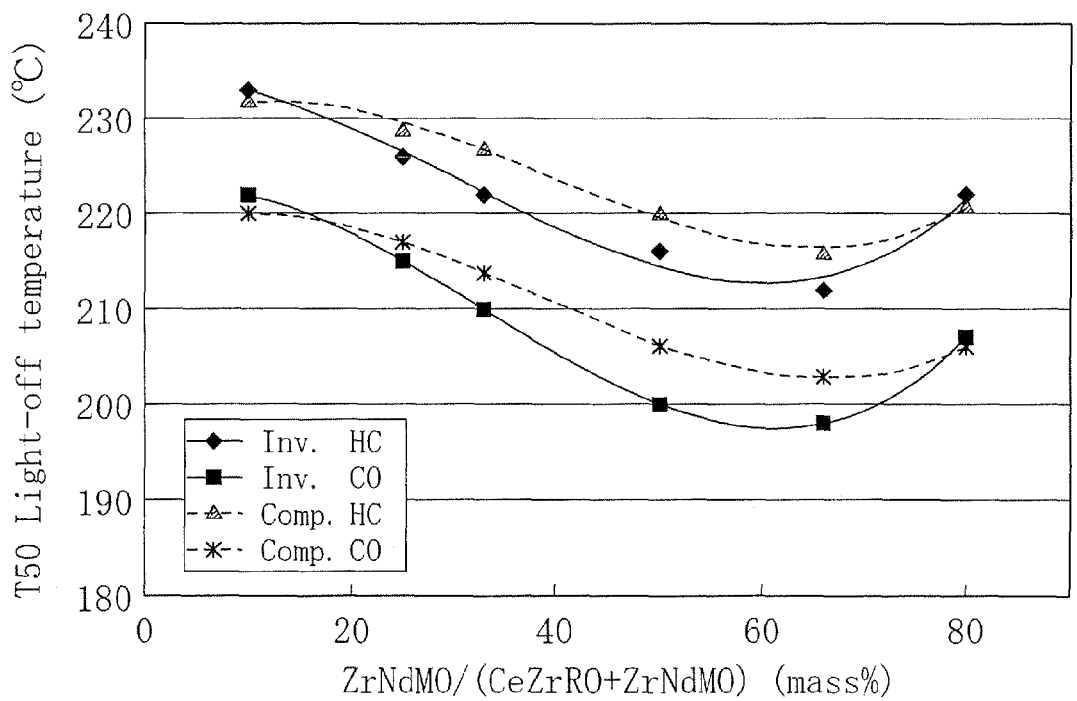
FIG. 26 is a graph showing the relation between light-off temperature and the ZrNdMO ratio of each of the inventive examples according to Embodiment 5 and their comparative examples.

Reference to FIG. 26 shows that when the ZrNdMO ratio was 25% to 67% by mass, both inclusive, the inventive examples exhibited lower light-off temperatures than the comparative examples. Even when the ZrNdMO ratio was 20% and 75% by mass, the inventive examples can be expected to have lower light-off temperatures than their comparative examples. The reason for these results can also be considered to be that since in the inventive examples the CeZr-based mixed oxide was dispersedly carried in the form of small primary particles on the surface of each secondary particle of the ZrNd-based mixed oxide, the oxygen storage/release efficiency of the CeZr-based mixed oxide increased and the heat resistance increased.

It can be said from the above that the ZrNdMO ratio is preferably 20% to 75% by mass, both inclusive, and more preferably 25% to 67% by mass, both inclusive.

<$ZrO_2$ Ratio of ZrNd-Based Mixed Oxide and $CeO_2$ Ratio of CeZr-Based Mixed Oxide>

—Preparation of Samples—

According to the above-stated method for preparing a catalyst material, various kinds of catalyst materials of inventive examples were prepared that had different $ZrO_2$ ratios of ZrNd-based mixed oxide ($ZrO_2$/ZrNdMO shown in % by mole) and different $CeO_2$ ratios of CeZr-based mixed oxide ($CeO_2$/CeZrRO shown in % by mole). Pr was used as the rare earth metal M for the ZrNd-based mixed oxide particle and the $Pr_2O_3$ ratio was fixed at 12% by mole. Nd was used as the rare earth metal R for the CeZr-based mixed oxide particle and the $Nd_2O_3$ ratio was fixed at 4% by mole. Furthermore, the catalytic metal Pt was carried on each support material by evaporation to dryness. The CeZrRO ratio was fixed at 67% by mass.

Furthermore, catalyst materials of comparative examples were obtained by preparing different kinds of CeZr-based mixed oxide secondary particles having different $CeO_2$ ratios and the same $Nd_2O_3$ ratio of 4% by mole by coprecipitation, preparing different kinds of ZrNd-based mixed oxide secondary particles having different $ZrO_2$ ratios and the same $Pr_2O_3$ ratio of 12% by mole by coprecipitation, physically mixing each kind of CeZr-based mixed oxide secondary particles with each kind of ZrNd-based mixed oxide secondary particles to attain a CeZrRO ratio of 67% by mass and thereby obtain various kinds of powdered support materials and carrying Pt on each of them by evaporation to dryness.

Then, according to the previously stated method for preparing a sample, samples (catalyst-supported particulate filters) were obtained by coating the catalyst materials of the inventive examples and comparative examples on their respective SiC-made filter supports having a volume of 25 mL, a cell wall thickness of 12 mil and 300 cpsi. The amount of each catalyst material carried per L of filter was 50 g/L, and the amount of Pt carried per L of filter was 1.0 g/L. Then, each sample was heat aged by keeping it at 800° C. for 24 hours in the atmospheric environment.

—Evaluation on Carbon Burning Property—

For each of the samples of the inventive examples and comparative examples, an amount of carbon (carbon black) corresponding to 10 g per L of filter was deposited on the walls of exhaust gas channels in the sample and the sample was then measured in terms of carbon burning rate at 590° C. according to the above-stated carbon burning property test. The measurement results on the inventive examples and the measurement results on the comparative examples are shown in Tables 20 and 21, respectively.

TABLE 20

Inventive Example; Carbon burning rate (g/hr, 590° C.)

| | | | ZrO$_2$/ZrNdMO ratio | | | |
|---|---|---|---|---|---|---|
| | | | No. 1 55% by mole | No. 2 75% by mole | No. 3 80% by mole | No. 4 90% by mole |
| CeO$_2$/ CeZrRO ratio | a | 10% by mole | 0.91 | 0.87 | 0.83 | |
| | b | 20% by mole | 1.01 | 0.93 | 0.85 | 0.75 |
| | c | 45% by mole | 1.02 | 0.91 | 0.82 | 0.72 |
| | d | 60% by mole | 0.91 | 0.86 | 0.78 | |
| | e | 80% by mole | 0.89 | 0.79 | | |

Primary particles of mixed oxide CeZrRO are carried on each secondary particle of mixed oxide ZrNdMO.

TABLE 21

Comparative Example; Carbon burning rate (g/hr, 590° C.)

| | | | ZrO$_2$/ZrNdMO ratio | | | |
|---|---|---|---|---|---|---|
| | | | No. 1 55% by mole | No. 2 75% by mole | No. 3 80% by mole | No. 4 90% by mole |
| CeO$_2$/ CeZrRO ratio | a | 10% by mole | 0.935 | 0.9 | | |
| | b | 20% by mole | 0.945 | 0.89 | 0.87 | |
| | c | 45% by mole | 0.95 | 0.89 | | |
| | d | 60% by mole | 0.94 | | | |
| | e | 80% by mole | 0.92 | | | |

Mixed oxide ZrNdMO secondary particles and mixed oxide CeZrRO secondary particles are mixed.

Reference to Tables 20 and 21 shows that when the CeO$_2$ ratio was 20% to 45% by mole, both inclusive, and the ZrO$_2$ ratio was 55% to 75% by mole, both inclusive, the inventive examples exhibited higher carbon burning rates than the comparative examples. The reason for these results can be considered to be that in the inventive examples the CeZr-based mixed oxide was dispersedly carried in the form of small primary particles on the surface of each secondary particle of the ZrNd-based mixed oxide. It can be said from the above that the effectiveness of the combination of a secondary particle of a ZrNd-based mixed oxide and primary particles of a CeZr-based mixed oxide in enhancing the carbon burning rate is a specific phenomenon within the above range of CeO$_2$ ratios and the above range of ZrO$_2$ ratios.

—Evaluation of Light-Off Performance for Exhaust Gas Conversion—

Furthermore, each of the samples of the inventive examples and comparative examples (the same as shown in Tables 20 and 21) was measured in terms of light-off temperature for conversion of HC and CO according to the above-stated light-off performance evaluation test. The measurement results on the inventive examples and the measurement results on the comparative examples are shown in Tables 22 and 23, respectively.

TABLE 22

Inventive Example; Light-off temperature T50 (° C.)

| | | | ZrO$_2$/ZrNdMO ratio | | | | | | | |
|---|---|---|---|---|---|---|---|---|---|---|
| | | | No. 1 55% by mole | | No. 2 75% by mole | | No. 3 80% by mole | | No. 4 90% by mole | |
| | | | HC | CO | HC | CO | HC | CO | HC | CO |
| CeO$_2$/ CeZrRO ratio | a | 10% by mole | 219 | 208 | 227 | 211 | | | | |
| | b | 20% by mole | 212 | 198 | 216 | 205 | 226 | 214 | 233 | 221 |
| | c | 45% by mole | 213 | 199 | 214 | 204 | 225 | 209 | 230 | 219 |
| | d | 60% by mole | 220 | 205 | 225 | 213 | 227 | 215 | | |
| | e | 80% by mole | 225 | 213 | 229 | 218 | | | | |

Primary particles of mixed oxide CeZrRO are carried on each secondary particle of mixed oxide ZrNdMO.

TABLE 23

Comparative Example; Light-off temperature T50 (° C.)

| | | | ZrO$_2$/ZrNdMO ratio | | | | | | |
| --- | --- | --- | --- | --- | --- | --- | --- | --- | --- |
| | | | No. 1 55% by mole | | No. 2 75% by mole | | No. 3 80% by mole | | No. 4 90% by mole |
| | | | HC | CO | HC | CO | HC | CO | HC CO |
| CeO$_2$/CeZrRO ratio | a | 10% by mole | 218 | 206 | 224 | 209 | | | |
| | b | 20% by mole | 216 | 203 | 226 | 213 | 224 | 213 | |
| | c | 45% by mole | 219 | 206 | 223 | 211 | | | |
| | d | 60% by mole | 219 | 204 | 223 | 210 | | | |
| | e | 80% by mole | 225 | 211 | 228 | 214 | | | |

Mixed oxide ZrNdMO secondary particles and mixed oxide CeZrRO secondary particles are mixed.

Reference to Tables 22 and 23 shows that when the CeO$_2$ ratio was 20% to 45% by mole, both inclusive, and the ZrO$_2$ ratio was 55% to 75% by mole, both inclusive, the inventive examples exhibited lower light-off temperatures than the comparative examples. The reason for these results can also be considered to be that in the inventive examples the CeZr-based mixed oxide was dispersedly carried in the form of small primary particles on the surface of each secondary particle of the ZrNd-based mixed oxide. It can be said from this that the effectiveness of the combination of a secondary particle of a ZrNd-based mixed oxide and primary particles of a CeZr-based mixed oxide in enhancing the light-off performance is a specific phenomenon within the above range of CeO$_2$ ratios and the above range of ZrO$_2$ ratios.

What is claimed is:

1. A catalyst-supported particulate filter in which a catalyst layer is formed on the walls of exhaust gas channels in a filter body for trapping particulates exhausted from an engine, wherein the catalyst layer contains a catalyst material containing at least two kinds of primary particles selected from the group consisting of:
   primary particles of activated alumina;
   primary particles of a ZrNd-based mixed oxide containing Zr, Nd and a rare earth metal M other than Ce and Nd;
   primary particles of a CeZr-based mixed oxide containing Ce, Zr and a rare earth metal R other than Ce; and
   secondary particles, each having a support surface, formed by cohesion of at least one kind of primary particles selected from the group consisting of primary particles of activated alumina and primary particles of the other of the ZrNd-based mixed oxide and the CeZr-based mixed oxide,
   wherein the catalyst material is formed so that primary particles of one of the ZrNd-based mixed oxide and the CeZr-based mixed oxide are dispersedly carried on the surface of each of secondary particles,
   wherein each of the secondary particles is formed by cohesion of primary particles of the ZrNd-based mixed oxide,
   the primary particles of the CeZr-based mixed oxide are dispersedly carried on the surface of each of the secondary particles, and
   the proportion of the ZrNd-based mixed oxide in the total amount of the ZrNd-based mixed oxide and the CeZr-based mixed oxide is 20% to 75% by mass, both inclusive.

2. The catalyst-supported particulate filter of claim 1, wherein
   the ZrNd-based mixed oxide contains ZrO$_2$ at a proportion of 55% to 75% by mole, both inclusive, and
   the CeZr-based mixed oxide contains CeO$_2$ at a proportion of 20% to 45% by mole, both inclusive.

3. The catalyst-supported particulate filter of claim 1, wherein Pt is carried as a catalytic metal on the secondary particles.

* * * * *

UNITED STATES PATENT AND TRADEMARK OFFICE
CERTIFICATE OF CORRECTION

| | | |
|---|---|---|
| PATENT NO. | : 8,187,548 B2 | Page 1 of 1 |
| APPLICATION NO. | : 12/249123 | |
| DATED | : May 29, 2012 | |
| INVENTOR(S) | : Hiroshi Yamada et al. | |

It is certified that error appears in the above-identified patent and that said Letters Patent is hereby corrected as shown below:

On the cover page, fifth inventor should be

(75)   Inventors:   Akihide TAKAMI, Hiroshima (JP)

Signed and Sealed this
Twelfth Day of February, 2013

Teresa Stanek Rea
*Acting Director of the United States Patent and Trademark Office*